(12) United States Patent
Kitabayashi et al.

(10) Patent No.: US 6,760,097 B2
(45) Date of Patent: Jul. 6, 2004

(54) LENS EVALUATION METHOD AND LENS-EVALUATING APPARATUS

(75) Inventors: Masashi Kitabayashi, Horigane-mura (JP); Koichi Kojima, Shimosuwa-machi (JP); Shunji Umemura, Hotaka-machi (JP)

(73) Assignee: Seiko Epson Corporation, Tokyo (JP)

( * ) Notice: Subject to any disclaimer, the term of this patent is extended or adjusted under 35 U.S.C. 154(b) by 446 days.

(21) Appl. No.: 09/976,142

(22) Filed: Oct. 15, 2001

(65) Prior Publication Data

US 2002/0044275 A1 Apr. 18, 2002

(30) Foreign Application Priority Data

Oct. 18, 2000 (JP) .......................... 2000-318541
Sep. 14, 2001 (JP) .......................... 2001-280670

(51) Int. Cl.[7] ............................................ G01M 11/00
(52) U.S. Cl. .................................................. 356/124.5
(58) Field of Search ................................. 356/124–127

(56) References Cited

U.S. PATENT DOCUMENTS 5,923,416 A * 7/1999 Rosow et al. ............ 356/124.5

FOREIGN PATENT DOCUMENTS

| JP | A 2-51038 | 2/1990 |
| JP | A 7-103853 | 4/1995 |

* cited by examiner

*Primary Examiner*—Frank G. Font
*Assistant Examiner*—Amanda Merlino
(74) *Attorney, Agent, or Firm*—Oliff & Berridge PLC

(57) ABSTRACT

A lens evaluation method for calculating resolution evaluation value based on a detected luminance value in order to evaluate resolution of lens has a background luminance value acquiring step for acquiring a luminance value at a background part having no test pattern formed thereon, a maximum luminance value acquiring step for acquiring maximum luminance value in the test pattern image, a minimum luminance value acquiring step for acquiring minimum luminance value and an evaluation value calculating step for calculating a resolution evaluation value based on the luminance values obtained in the respective steps.

8 Claims, 26 Drawing Sheets

FIG.12
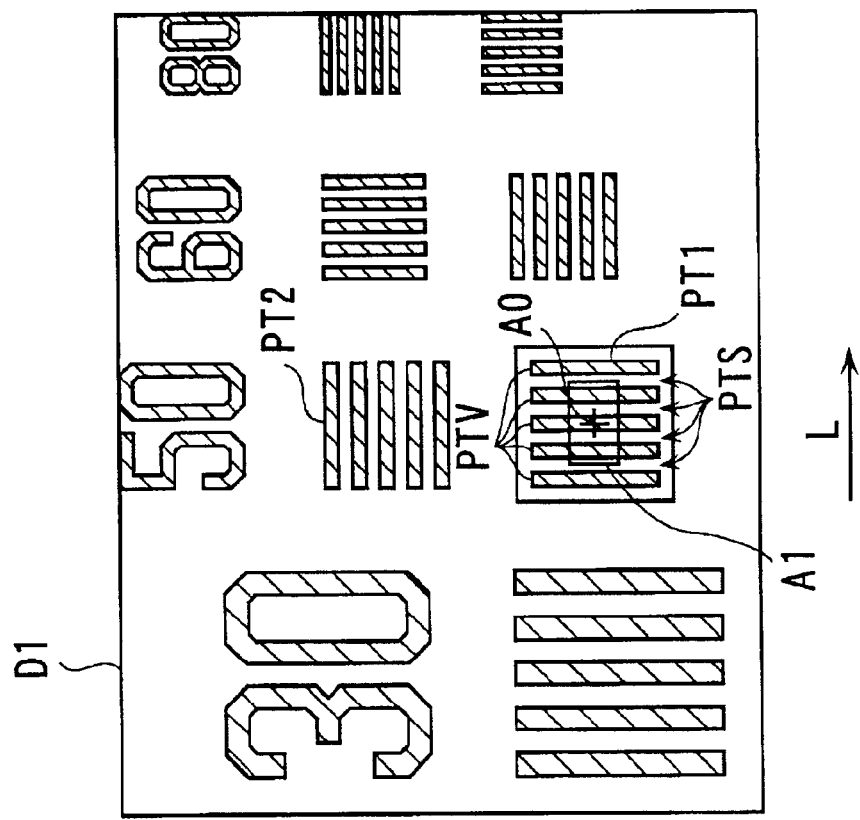
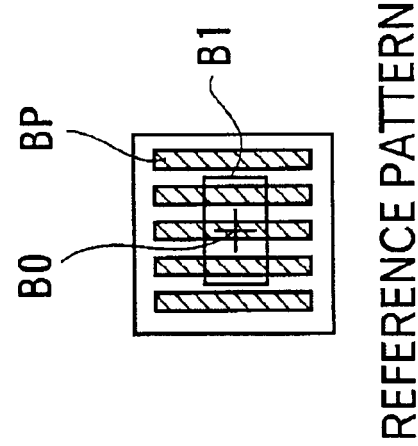
REFERENCE PATTERN

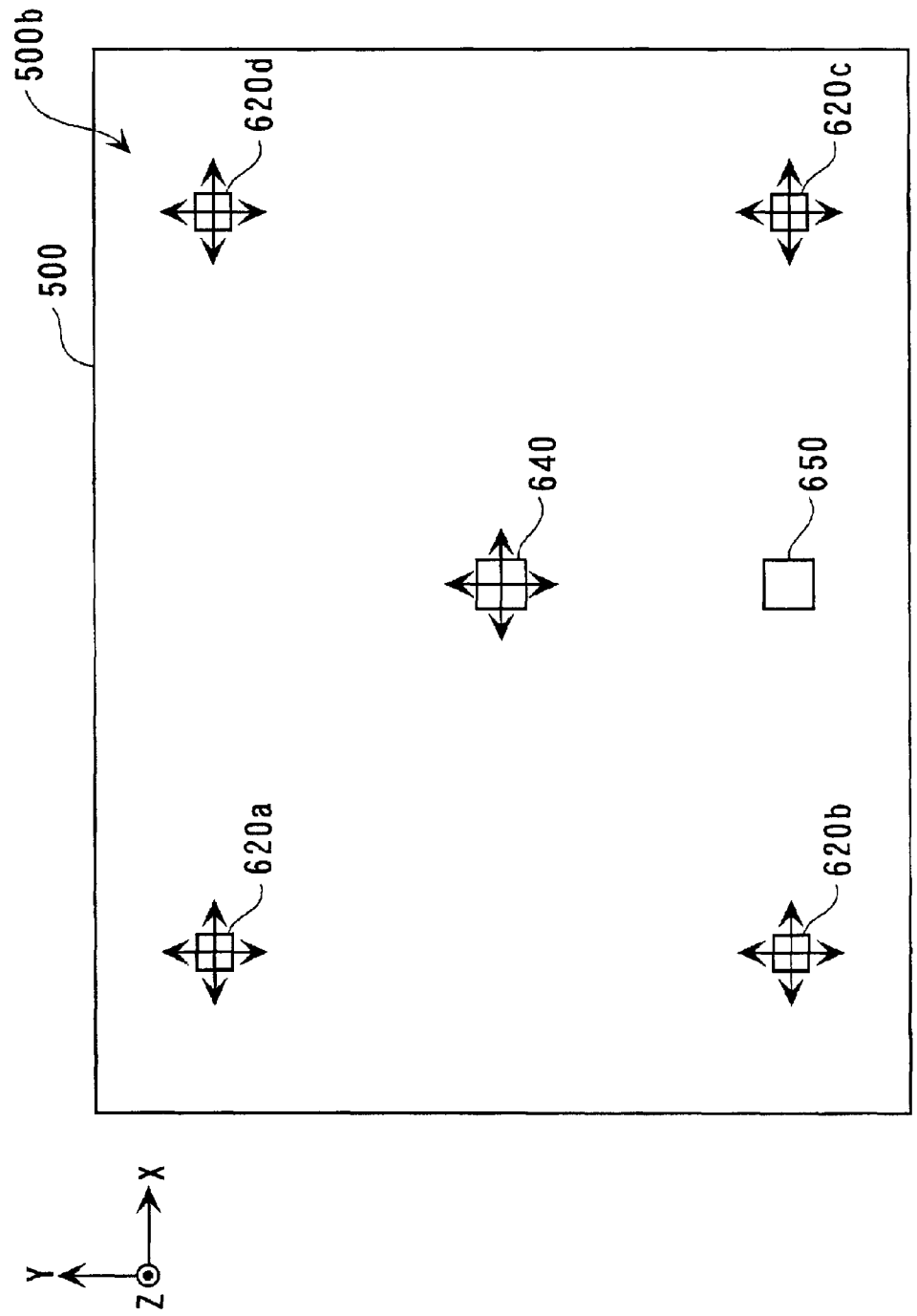

LENS EVALUATION METHOD AND LENS-EVALUATING APPARATUS

BACKGROUND OF THE INVENTION

1. Field of the Invention

The present invention relates to a lens evaluation method for evaluating resolution of a lens used for a projector, where an image light including test pattern for measuring resolution is irradiated on a screen through a projection lens to display the image of the resolution-measuring test pattern on the screen and the luminance of the displayed test pattern image is detected by an image import device using an image sensor to calculate a resolution evaluation value based on the detected luminance value, and a lens-evaluating apparatus for implementing the evaluation method.

2. Description of Related Art

Conventionally, a projector including a plurality of liquid crystal panels for modulating a plurality of colors of light in accordance with image information, a cross dichroic prism for combining the color light modulated by the respective liquid crystal panels, and a projection lens for enlarging and projecting the light combined by the prism has been used.

The projection lens used in the projector may have diverse properties such as image resolution, flare and chromatic aberration on account of variation in production process thereof. Since the diversity of the properties of the projection lens exerts influence on the image displayed by the projector, the properties of image resolution, flare and chromatic aberration are evaluated before the lens manufacturer forward the lens and before the lens is assembled into a projector.

Specifically, in order to evaluate, for instance, the resolution of the projection lens, a resolution-measuring test pattern is formed on an evaluation sheet, light is irradiated on the test pattern to introduce an image light including the test pattern into the projection lens, and the image light irradiated by the projection lens is projected on the screen. The image of the test pattern displayed on the screen is detected by an image import device using an image sensor such as a CCD (Charge Coupled Device). The image detected by the device is image-processed by a computer etc. to evaluate the resolution of the projection lens.

In the above, MTF (Modulation Transfer Function) value is generally used as a resolution evaluation value for evaluating the resolution of the lens, which can be obtained according to following formula, where the maximum value of the detected luminance value of the test-pattern image is Imax and the minimum value thereof is Imin.

$$MTF = (Imax - Imin)/(Imax + Imin)$$

However, in the above arrangement, since measured luminance used for calculating the MTF value calculated by the above formula is a relative value, the MTF value may be varied according to brightness of the image.

Further, in evaluating the resolution of the projection lens, since the image light irradiated from the projection lens to be projected on the screen tends to have the strongest intensity at the central portion to be grown weaker toward the peripheral portion thereof, even when the luminance value is obtained on a plurality of portions of the image projected on the screen, the MTF value cannot be evaluated according to the same standard.

Furthermore, when the brightness of the projected image differ according to the type of the projector, the MTF value of the respective projectors cannot be compared according to the same standard.

SUMMARY OF THE INVENTION

An object of the present invention is to provide a lens evaluation method and lens-evaluating device capable of appropriately evaluating the resolution of the lens without being influenced by the type of projector and measured position.

In order to achieve an object of the present invention, a lens evaluation method according to an aspect of the present invention includes the steps of: irradiating an image light including a resolution-measuring test pattern onto a screen through a lens to display an image of the resolution-measuring test pattern on the screen; detecting a luminance of the image of the displayed test pattern by an image import device using an image sensor, a resolution evaluation value being calculated based on the detected luminance value; acquiring a background luminance value of a background part without the test pattern being formed by the image import device using the image sensor; acquiring a maximum luminance value in the test pattern image by the image import device using the image sensor; acquiring a minimum luminance value in the test pattern image by the image import device using the image sensor; and calculating the resolution evaluation value based on the background luminance value, the maximum luminance value and the minimum luminance value obtained through the respective steps.

A resolution chart measuring test pattern having a bright part and a dark part at a predetermined spatial frequency used in evaluating general optical system can be used as the resolution-measuring test pattern. The spatial frequency may be a plurality of spatial frequencies between 20 line/mm to 80 line/mm. Specifically, a parallel-line resolution chart may be used as the resolution-measuring test pattern, the spatial frequency being set as 20 line/mm, 25 line/mm, 30 line/mm, 50 line/mm and 80 line/mm, where two types of mutually orthogonal parallel-line resolution charts are used as one set to form the test pattern.

The above maximum luminance value refers to the luminance value at the brightest part in the test pattern image, the minimum luminance value refers to the luminance value at the darkest part, which can be obtained by conducting image processing for detecting luminance of an image such as pattern matching on the test pattern image taken by the image sensor.

The evaluation method of the present invention is suitably applied in an arrangement using an image import device with an image sensor having divergence between level-zero value on the output side and level-zero value on the input side so that level-zero light is not outputted from the output side even when the level-zero light is introduced into the input side thereby generating offset value. The image sensor may be CCD, MOS (Metal Oxide Semiconductor) sensor etc. The image import device may be an image data generator such as a video capturing board for converting an output of the image sensors into an image signal for computer.

According to the above arrangement, since the resolution evaluation value is calculated based on the background luminance value, the maximum luminance value and the minimum luminance value, even when the brightness of the image projected on the screen differs, the resolution evaluation value calculated based on the background luminance value, the maximum luminance value and the minimum luminance value taken at a plurality of positions can be evaluated according to the same standard by conducting correction processing by adding the background luminance value, so that the resolution of the lens can be appropriately evaluated without being influenced by the type of projector and location on the displayed image.

In the above, the resolution evaluation value (MTF) calculated by the evaluation value calculating step is represented according to following formula [1] where the background luminance value is represented as Io, the maximum luminance value is represented as Imax and the minimum luminance value is represented as Imin.

$$MTF=(Imax-Imin)/(Io*2-Imax-Imin) \quad [1]$$

The formula [1] can be obtained according to the following process.

When the image of the parallel-line resolution-measuring pattern C1 as shown in FIG. 1 is detected using an image sensor and the resolution is evaluated on the luminance value of the bright part and dark part of the pattern C1 detected by the image sensor, the resolution evaluation value MTF can be given as a ratio between an input level as an input contrast ratio of the image light incident on the projection lens and an output level as an output contrast ratio of the image detected by the image sensor such as CCD camera, which can be calculated by the following formula [2].

$$MTF=(\text{output level})/(\text{input level}) \quad [2]$$

The output level in the formula [2] can be substituted by (Imax–Imin), so the formula [2] can be replaced with following formula [3].

$$MTF=(Imax-Imin)/(\text{input level}) \quad [3]$$

On the other hand, as shown in FIG. 2, when the value of ($I_{100\%}$–Imax) is equal to the value of (Imin–$I_{0\%}$), the input level can be calculated according to the following formula [4] under the condition that the input-side $I_{0\%}$ is the same value as the value of the output-side.

$$(\text{Input level})=Imax+(I_{100\%}-Imax)=Imax+(Imin-I_{0\%})=Imax+Imin \quad [4]$$

Accordingly, the resolution evaluation value MTF can be calculated according to following formula [5] as described in the related art section.

$$MTF=(Imax-Imin)/(Imax+Imin) \quad [5]$$

However, when the relationship between the input level and the output level is examined from the image acquired by the image import device using the image sensor such as CCD, offset value ($I_{0\%}$–$I_{CCD\%}$) is generated on the output level side as shown in FIG. 3. Accordingly, when the input level is calculated based on the formula [5], twice as much value as the offset value is added, so that the calculated input level becomes greater than an actual input level value. Further, the offset value of the image sensor such as CCD may change in accordance with the change in the background luminance value. For instance, the offset value becomes greater as the background luminance value is decreased (darkened), so that, as a result, the calculated resolution evaluation value MTF becomes smaller than the actual value, which becomes further smaller as the background luminance is decreased (darkened).

Accordingly, in order to obtain an accurate resolution evaluation value MTF, a correction processing for removing offset amount of the image import device using the image sensor such as CCD is required.

In order to remove the offset amount, the input level can be obtained according to the following formula [6] when the output-side maximum luminance value Imax, minimum luminance value Imin shown in FIG. 3, and a read value Io of the luminance on the output-side at the maximum luminance value $I_{100\%}$ on the input-side can be determined.

$$(\text{Input level})=Imax-Imin+(Io-Imax)*2=Io*2-Imax-Imin \quad [6]$$

Since the resolution evaluation value MTF becomes 1 when the spatial frequency=0, i.e. when there is no pattern, the brightness of the part having no test pattern, i.e. the luminance value of the background part should be measured. Further, the formula [6] is calculated by adding difference of the luminance value detected by the image sensor such as CCD, so that the offset amount is canceled and the obtained input level becomes a value removed with the offset amount. According to the above, the appropriate resolution evaluation value MTF removing the offset amount of the image import device using the image sensor such as CCD can be obtained according to following formula [7].

$$MTF=(Imax-Imin)/(Io*2-Imax-Imin) \quad [7]$$

According to the present invention, since the resolution evaluation value MTF can be calculated according to the formula represented as [7], accurate resolution evaluation value can be obtained and the resolution of the projection lens can be appropriately evaluated without being influenced by the type of projector and location on the displayed image.

When the above-described image sensor is a charge coupled device, the background luminance value acquiring step, the maximum luminance value acquiring step and the minimum luminance value acquiring step may preferably be conducted at a part where an output of the charge coupled device in response to the luminance value is in proportional relationship.

In the image sensor such as CCD, the relationship between the image light and the luminance value lacks proportionality where the output is too bright or too dark, thus failing to obtain an appropriate luminance value. Accordingly, by providing a light adjuster such as diaphragm for adjusting brightness of the image light incident on the image sensor such as CCD, the measurement can be conducted at a portion where the linearity of the image sensor can be maintained, so that the accurate resolution evaluation value can be calculated in the evaluation calculating step.

The lens may preferably be arranged as a lens set including a plurality of light condensers disposed along an optical axis direction and has a zooming function for enlarging and contracting a projected image by changing relative position of the respective light condensers, and the background luminance value acquiring step, the maximum luminance value acquiring step and the minimum luminance value acquiring step may preferably be conducted at least for the minimum magnification and maximum magnification of the lens respectively.

When the projected image is enlarged and contracted by changing relative position of the respective light condensers of a lens set having a plurality of light-condensers disposed along an optical axis direction, the resolution evaluation value MTF may sometimes show a different value according to the enlarged projected image and the contracted projected image. Accordingly, in order to evaluate the resolution, the resolution evaluation value MTF is calculated at the minimum magnification and the maximum magnification of the lens set for evaluating the lens. By conducting such evaluation, when the lens set is installed in a projector, divergence of the resolution evaluation value MTF caused when the projected image is enlarged and contracted can be reduced in the projector.

When the image sensor is movable along the screen, the method may preferably further include the steps of: moving the image sensor along an outer periphery of the projected image projected on the screen; acquiring the peripheral image of the projected image at a predetermined position by the image import device using the image sensor while moving the image sensor; and calculating a distortion aberration of the projected image based on the peripheral image of the projected image acquired during the peripheral image acquiring step.

According to the above arrangement, since the image sensor is movable along the surface of the screen and the image sensor moving step, the peripheral image acquiring step and the distortion aberration calculating step are provided, the image sensor can be moved along the outer periphery of the projected image projected on the screen and the peripheral image can be acquired at the predetermined position by the image import device using the image sensor. Therefore, the peripheral image can be acquired at any position on the projected image and can be compared with a designed image projecting position to calculate the distortion aberration, so that the ambiguity of evaluation accuracy of conventional visual check can be eliminated and the distortion aberration can be accurately evaluated.

A check sheet formed with the test pattern may preferably include a frame portion formed adjacent to an outer periphery of a formation area of the projected image, and the image of the frame portion may preferably be acquired during the peripheral image acquiring step.

According to the above arrangement, when the check sheet includes the frame portion formed adjacent to the outer periphery of the formation area of the projected image, the profile of the frame portion can be easily and highly accurately identified from the peripheral image of the obtained frame portion by obtaining the peripheral image along the outer periphery of the frame portion formed on the screen during the peripheral image acquiring step, thereby further accurately evaluating distortion aberration.

The above method may preferably further include the steps of: calculating an input level value based on the background luminance value, the maximum luminance value and the minimum luminance value, where the background luminance value acquiring step, the maximum luminance value acquiring step, the minimum luminance value acquiring step and the input level value calculating step are conducted at a plurality of positions in the projected image; acquiring an illumination at a predetermined first position of the projected image where the background luminance value acquiring step, the maximum luminance value acquiring step, the minimum luminance value acquiring step and the input level value calculating step are conducted; and calculating an in-plane illumination of the entire projected image by calculating the illumination of a second position other than the first position based on the input level value and illumination at the first position and the input level value at the second position.

According to the above arrangement, the input level value as a relative value can be obtained by conducting the background luminance value acquiring step, the maximum luminance value acquiring step, the minimum luminance value acquiring step and the input level value calculating step at a plurality of positions in the projected image.

Further, by conducting the illumination acquiring step at the predetermined first position and the in-plane illumination calculating step, the in-plane illumination distribution can be evaluated based on the illumination at the predetermined position and the input level value.

The input level value is calculated based on the background luminance value, the maximum luminance value and the minimum luminance value and, therefore, is an evaluation value canceling the offset value generated in the image import device using an image sensor, so that the illumination at the predetermined position and the in-plane illumination of the projected image calculated based on the input level value can be evaluated in accordance with the same standard. Accordingly, the ambiguity of accuracy in conventional visual check can be eliminated and accurate in-plane illumination distribution can be evaluated.

In the above, the illumination (Le) at the second position may preferably be represented as $$Le=Lo*Iie/Iio \qquad [8]$$

where the input level value at the second position is represented as Iie, the input level value at the first position is represented as Iio and the illumination at the first position is represented as Lo.

According to the above arrangement, since the illumination of the second position can be obtained as a product of ratio of input level value as a relative value calculated according to the above formula [8] and the illumination of the first position as an absolute value, accurate illumination can be obtained and the in-plane illumination distribution can be evaluated by comparing the plurality of illuminations. Accordingly, more accurate in-plane illumination distribution of the projected image can be evaluated.

A lens-evaluating apparatus for evaluating a resolution of a lens according to another aspect of the present invention includes: a check sheet formed with a resolution-measuring test pattern; a light source for irradiating light on the check sheet to introduce an image light including the test pattern to the lens; a screen to which the image light irradiated by the lens is projected; an image sensor for taking an image of the test pattern displayed on the screen; an image import device for importing the image taken by the image sensor to generate an image signal; and a signal processor including a resolution evaluation value calculator that arithmetically operates the resolution evaluation value based on the image signal outputted by the image import device, in which the image sensor is provided with a light adjuster for adjusting an amount of light incident on the image sensor, the light adjuster being controlled based on a control signal from the signal processor.

The light adjuster may be an automatic diaphragm adjusting mechanism capable of being remotely operated from the signal processor.

According to the present aspect of the invention, since the light adjuster is provided, the amount of light incident on the image sensor such as CCD can be adjusted in accordance with dispersion of luminance of the image light on the screen, so that the amount of light inputted into the image sensor can be kept always constant, so that the resolution evaluation value calculated by the light-amount-adjusted image can be evaluated according to the same standard.

Further, the resolution evaluation value of the resolution evaluation value calculator can be calculated in the same manner as the lens evaluation method, by which the same function and advantages can be obtained. The resolution evaluation value calculator can be arranged as a program extended on an OS (operating system) for controlling the operation of the computer, which may include a background luminance value acquiring portion, a maximum luminance value acquiring portion, a minimum luminance value acquiring portion and an evaluation value calculating portion.

The lens evaluation apparatus according to the present invention may preferably further include an image sensor moving mechanism that moves the image sensor along a surface of the screen, the signal processor may further include: an image sensor controller for controlling movement of the image sensor along an outer periphery of the projected image projected on the screen; a peripheral image sensor for acquiring a peripheral image of the projected image at a predetermined position with the image import device using the image sensor while moving the image sensor by the image sensor controller; and a distortion aberration calculator for calculating a distortion aberration of the projected image based on the peripheral image of the projected image acquired by the peripheral image sensor.

According to the above arrangement, since the apparatus has the image sensor moving mechanism for moving the image sensor along the screen surface and the signal processor includes the image sensor controller, the peripheral image sensor and the distortion aberration calculator, the distortion aberration of the lens can be calculated by the distortion aberration calculator in the same manner as in the lens evaluation method, whereby the same function and advantage as in the above can be obtained.

In the lens-evaluating apparatus of the present invention, the check sheet may further include a frame portion formed adjacent to an outer periphery of a formation area of the projected image projected on the screen.

According to the above arrangement, since the check sheet includes a frame portion formed adjacent to the outer periphery of the formation area of the projected image projected on the screen, the image sensor controller can move the image sensor along the outer periphery of the frame portion, the peripheral image sensor can acquire the peripheral image of the frame portion at a predetermined position and the distortion aberration calculator can calculate the distortion aberration of the projected image based on the obtained peripheral image. Accordingly, the signal processor can easily obtain the peripheral image of the frame portion to calculate the distortion aberration, so that the distortion aberration can be rapidly and highly accurately evaluated.

The lens-evaluating apparatus according to the above aspect of the present invention may preferably include an illumination sensor for detecting an illumination at a predetermined first position in the projected image.

According to the above arrangement, since the illumination sensor for detecting illumination at the predetermined position in the projected image is provided, the difference of the illumination resulted by the nature of the lens can be evaluated by comparing the detected illumination for respective lens to be checked.

In the lens-evaluating apparatus, the resolution evaluation value calculator arithmetically may preferably operate an input level value based on the background luminance value, the maximum luminance value and the minimum luminance value and the input level value is acquired by the resolution evaluation value calculator at a plurality of positions in the projected image including the first position where the illumination is detected, and the signal processor may preferably include an in-plane illumination calculator for calculating an in-plane illumination of the entire projected image by calculating the illumination of a second position other than the first position based on the illumination at the first position detected by the illumination sensor, the input level value at the first position calculated by the resolution evaluation value calculator and the input level value at the second position.

According to the above arrangement, since the signal processor includes the in-plane illumination calculator, the in-plane illumination can be calculated by the in-plane illumination calculator in the same manner as in the above-described lens evaluation method, whereby the same function and advantages can be obtained.

BRIEF DESCRIPTION OF THE DRAWINGS

FIG. 12 is a schematic illustration showing measuring area setting according to the lens evaluation method of the aforesaid embodiment.

FIG. 20 is a front elevational view showing a disposition of illumination sensor on the screen of the aforesaid second embodiment;

DETAILED DESCRIPTION OF PREFERRED EMBODIMENT(S)

An embodiment of the present invention will be described below with reference to attached drawings.

[1. First Embodiment]
(1) Structure of Projector Installed with Projection Lens

Figure 1:
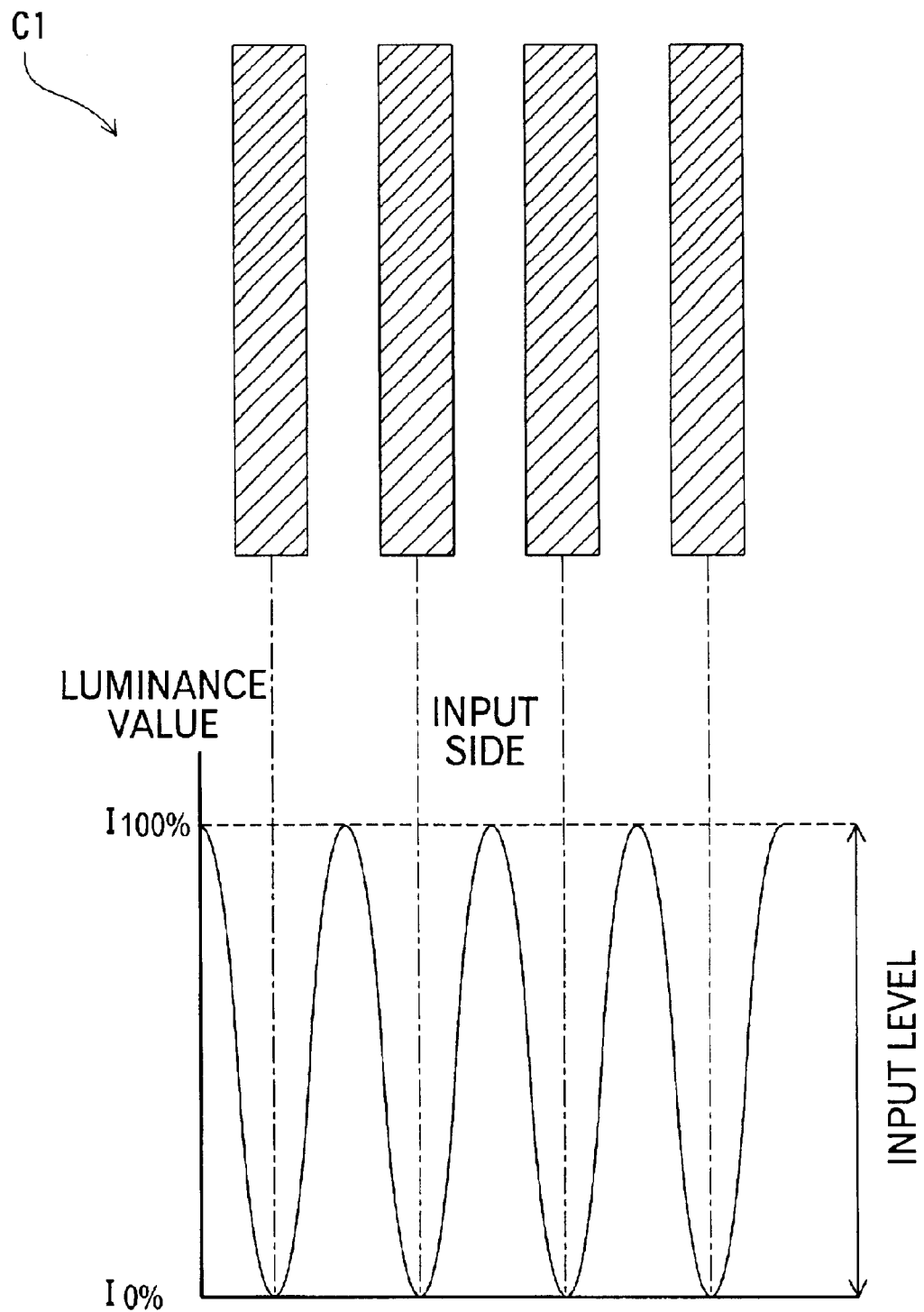
FIG. 1 is a schematic illustration of test pattern for measuring resolution according to the present invention.
Figure 2:
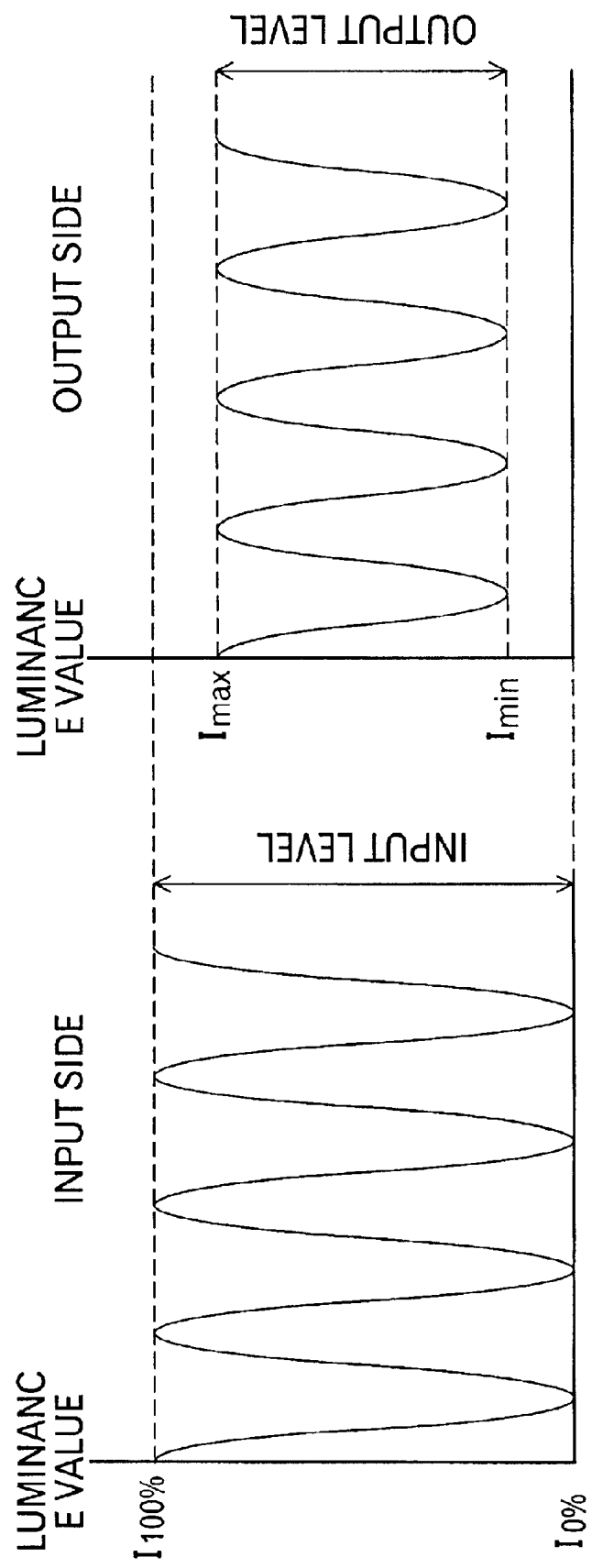
FIG. 2 is a graph showing a function of the present invention.
Figure 3:
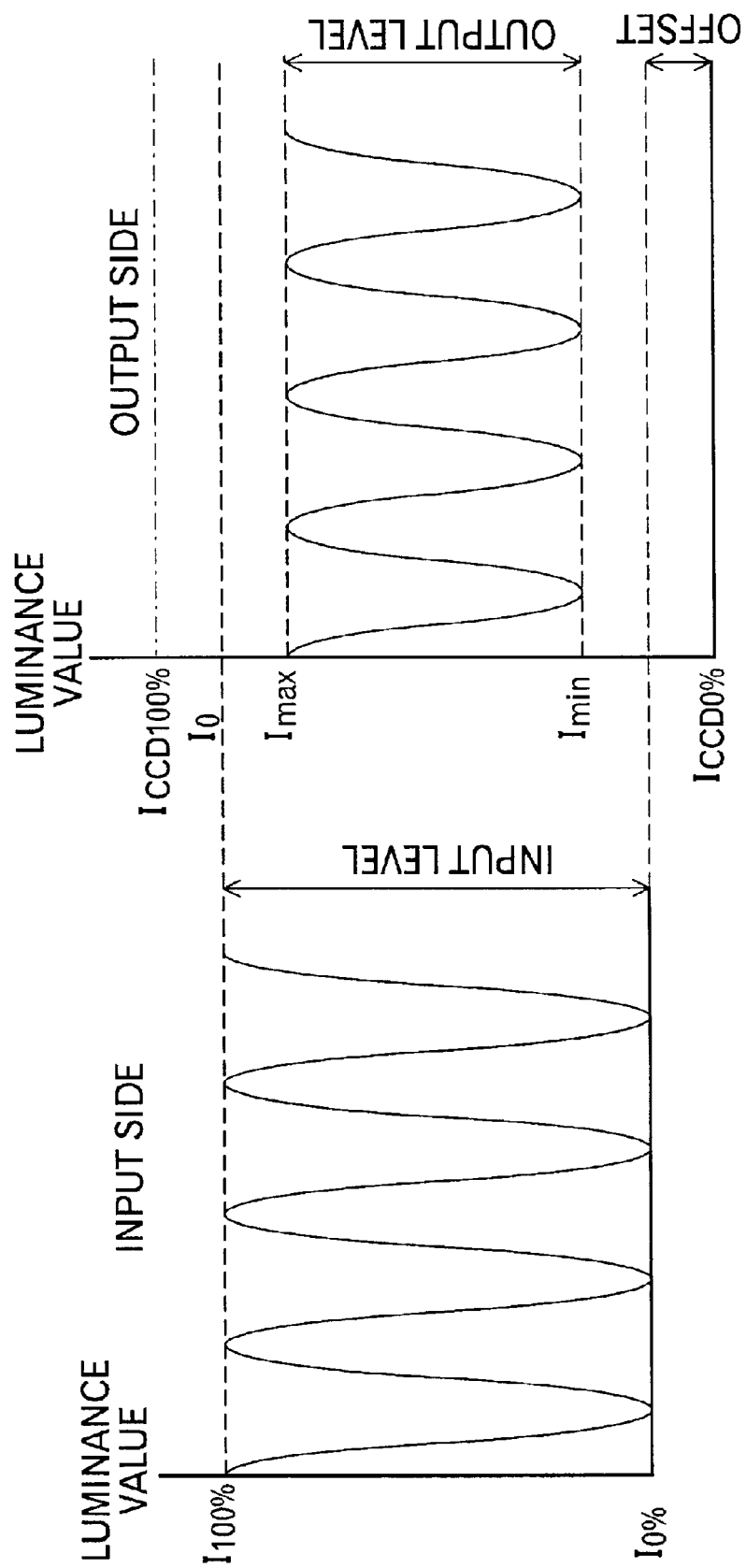
FIG. 3 is a graph showing a function of the present invention.
Figure 4:
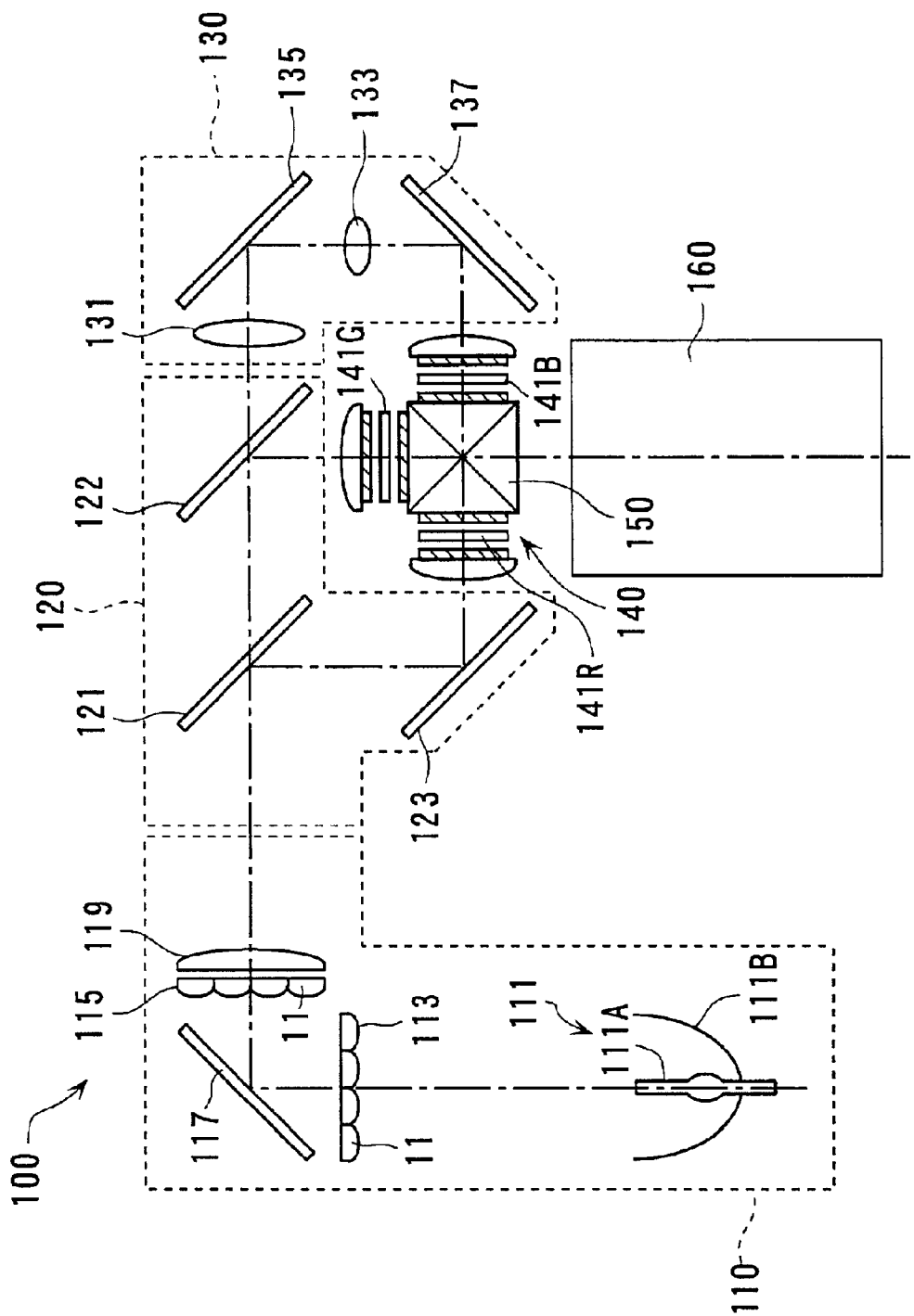
FIG. 4 is a schematic illustration of a structure of projector including a projection lens to be evaluated according to an embodiment of the present invention.

FIG. 4 shows a structure of a projector 100 for a projection lens to be installed. The projector 100 includes an integrator illuminating optical system 110, a color-separating optical system 120, a relay optical system 130, an electric optical device 140, a cross dichroic prism 150 as a color-combining optical system and a projection lens 160 as a projection optical system.

The integrator illumination optical system 110 has a light source 111 including light source lamp 111A and a reflector 111B, first lens array 113, second lens array 115, a reflection mirror 117 and a superposition lens 119. Irradiating direction of the light beam irradiated by the light source lamp 111A is aligned by the reflector 111B and is separated into a plurality of sub-beams by the first lens array 113, which is focused around the second lens array 115 after the irradiating direction is bent at a right angle by a bending mirror. The respective sub-beams irradiated by the second lens array are incident on the downstream incident surface of the superposition lens 119 so that the central axis (main beam) thereof is perpendicular on the incident surface. The plurality of sub-beams irradiated by the superposition lens 119 are superposed on the three liquid crystal panels 141R, 141G and 141B constituting the electric optical device 140.

The color separating optical system 120 has two dichroic mirrors 121 and 122 and a reflection mirror 123, where the mirrors 121, 122 and 123 separate the plurality of sub-beams irradiated from the integrator illuminating optical system 110 into three color lights of red, green and blue.

The relay optical system 130 includes an incident-side lens 131, a relay lens 133 and a reflection mirrors 132 and 134, which introduces the color light, blues light for instance, separated by the color separating optical system 120 into the liquid crystal panel 141B.

The electric optical device 140 has the liquid crystal panels 141R, 141G and 141B which, for instance, use a polysilicon TFT as switching element. The respective color lights separated by the color-separating optical systems 120 is modulated by the three crystal panels 141R, 141G and 141B in accordance with image information to form an optical image.

The cross dichroic prism 150 combines the images modulated for respective color lights irradiated from the three liquid crystal panels 141R, 141G and 141B to form a color image. The color image combined by the cross dichroic prism 150 is irradiated from the projection lens 160 and is enlarged and projected on the screen.

(2) Projection Lens Evaluation Apparatus

Figure 5:
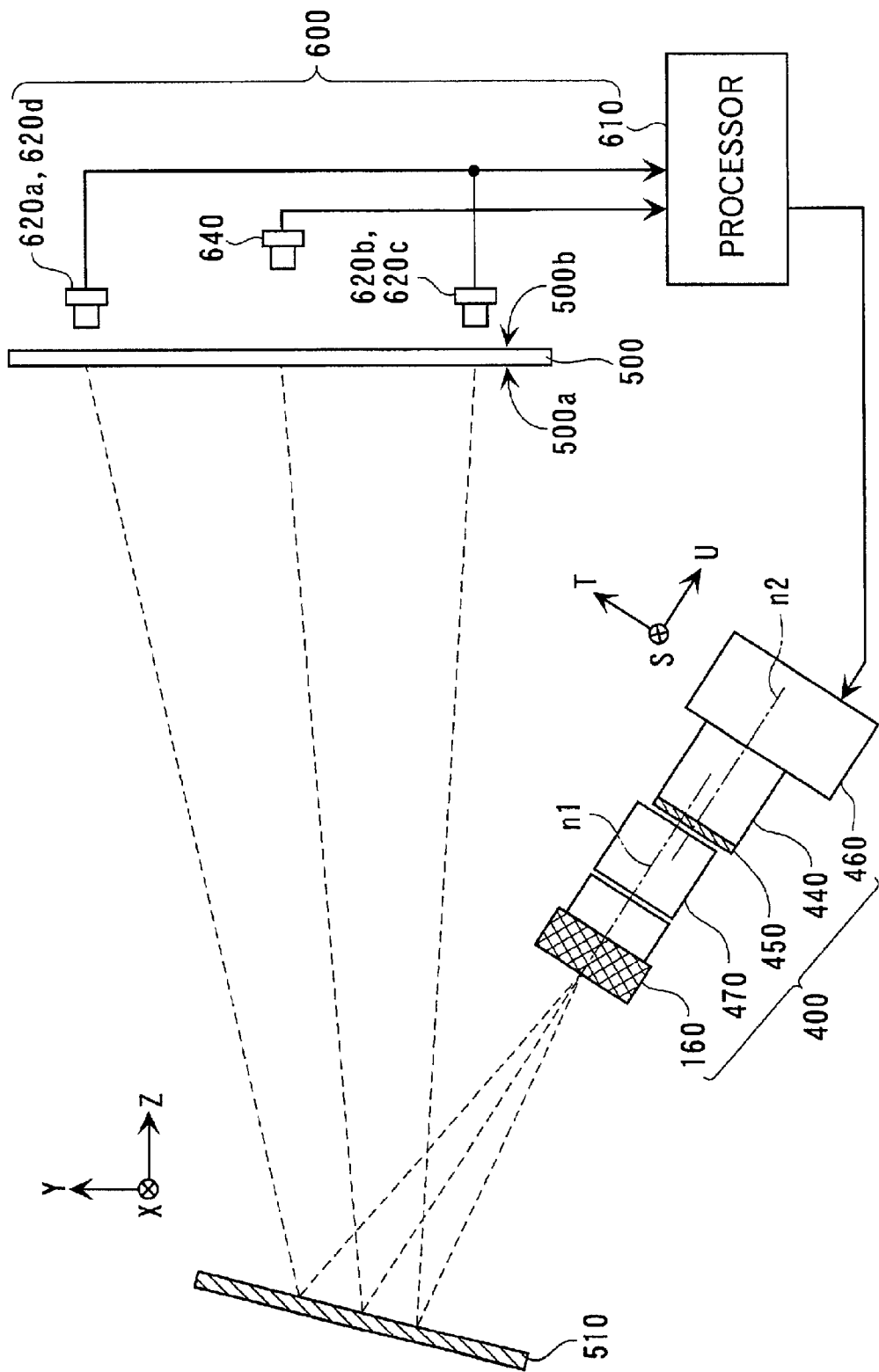
FIG. 5 is a schematic diagram showing a structure of a lens-evaluating apparatus of the aforesaid embodiment.

FIG. 5 is an illustration showing a projection lens evaluation apparatus according to an embodiment of the present invention. The apparatus is for evaluating the projection lens 160 used for the projector 100 in FIG. 4.

The projection lens evaluating apparatus according to the present embodiment has a projecting portion 400 for the projection lens 160 (object to be evaluated) to be mounted, a mirror 510, a screen 500 and a measuring portion 600. The projection lens 160 is capable of attaching and detaching, and is easily exchanged with the other projection lenses.

The image light (light representing an image) irradiated by the projecting portion 400 is reflected by the mirror 510 to irradiate the screen 500. The screen 500 is a light-transmissive screen capable of observing the image from a backside 500b opposite to a projection surface 500a on which the image light is projected. The measuring portion 600 evaluates the resolution of the projection lens using the image displayed on the screen 500.

Incidentally, the evaluation apparatus will be described below with reference to XYZ rectangular coordinates system having an XY plane parallel to the projection surface 500a of the screen 500 as shown in FIG. 5. The projection lens 160 is disposed in a manner inclined by a predetermined angle relative to an XZ plane by a holder (not shown). Accordingly, in the following description, the projecting portion 400 will be described below with reference to STU rectangular coordinates system defined by rotating the XYZ rectangular coordinates system around the X-axis by the predetermined angle. Incidentally, central axis n1 of the projection lens 160 is parallel to the SU plane.

Figure 6:
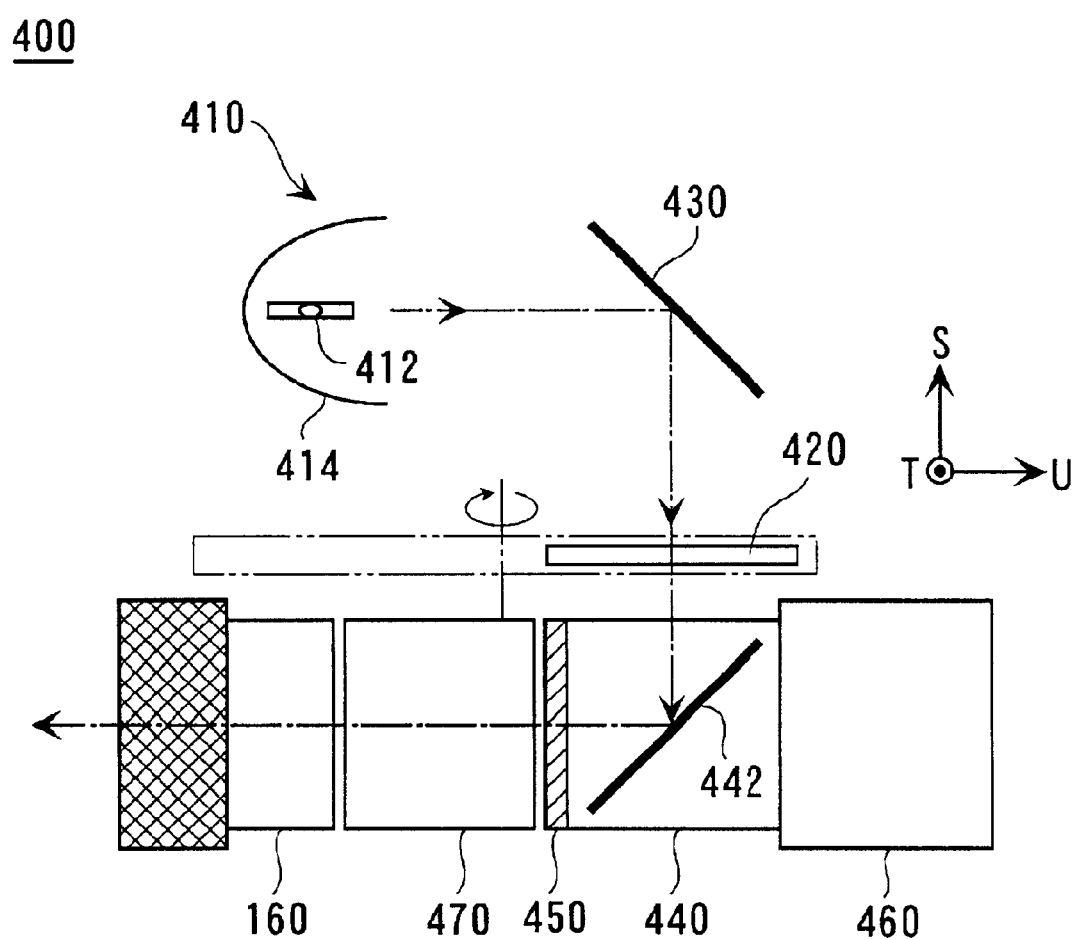
FIG. 6 is another schematic diagram showing the structure of the lens-evaluating apparatus of the aforesaid embodiment.

FIG. 6 is an illustration of the projecting portion 400 of FIG. 5 seen from +T direction. As shown in FIG. 6, the projecting portion 400 has a light source 410, first and second mirrors 430 and 442, projection lens check sheet 450, a check sheet holder 440, a six-axis adjuster 460 for adjusting the disposition of the check sheet holder 440 and a dummy prism 470 as well as the projection lens 160.

Incidentally, the check sheet holder 440 holds the check sheet 450 so as not to touch the second mirror 442. Since the light source 410 and the first mirror 430 shown in FIG. 6 are located in +S direction (depth side in the figure) relative to the six-axis adjuster 460, the check sheet holder 440, the dummy prism 470 and the projection lens 160, illustration thereof is omitted in FIG. 5.

Incidentally, as shown in FIG. 6, the projecting portion 400 is structured so that approximately the same light as using the projector 100 of FIG. 4 enters into the projection lens 160. Specifically, the light source 410 corresponds to the light source 111 of FIG. 4, the projection lens check sheet 450 corresponds to the liquid crystal panels 141R, 141G and 141B of FIG. 4, and the dummy prism 470 corresponds to the cross dichroic prism 150 of FIG. 4. The projection lens can be checked in an environment similar to an arrangement using the projection lens in the projector by using the evaluation device having such projecting portion 400.

The light source 410 of FIG. 6 has a source lamp 412 and a paraboloid reflector 414. The paraboloid reflector 414 has a concave surface of rotary paraboloid shape. The light source lamp 412 is disposed around a focus position of the rotary paraboloid concave surface. According to the arrangement, the light irradiated from the light source lamp 412 and reflected by the paraboloid reflector 414 is irradiated from the light source 410 in an approximate parallel light beam. Incidentally, metal halide lamp and high-pressure mercury lamp etc. are used for the light source lamp 412. Glass-ceramic-made rotary paraboloid having concave surface coated with a reflective film such as dielectric multi-layered film and metal film is used as the paraboloid reflector 414.

The first and the second mirrors 430 and 442 are light-introducing means for introducing the color light irradiated from the light source 410 and passed through a color-light filter 420 into the projection lens 160. A mirror formed with dielectric multi-layered film reflecting all of the color lights and metal mirror may be used as the first and the second mirrors 430 and 442.

Figure 7:
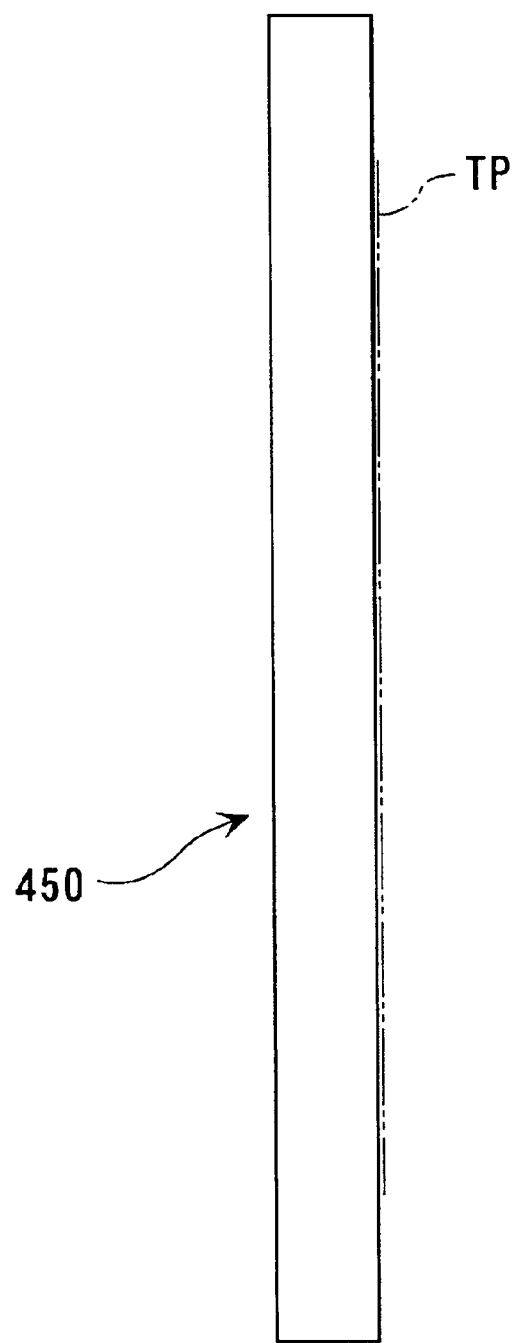
FIG. 7 is a side elevational view showing a check sheet of the aforesaid embodiment.

As shown in FIG. 7, the projection lens check sheet 450 has a base member made of light-transmissive material such as glass of a predetermined thickness (1.1 mm for instance) and formed with an image area (test pattern) TP on the front surface thereof, which has a predetermined vertical and horizontal dimensions (e.g. 14.6 mm*18 mm) and has rectangular image area (test pattern) TP of predetermined vertical and horizontal dimensions (e.g. 10.8 mm*14.4 mm) formed thereinside.

Figure 8:
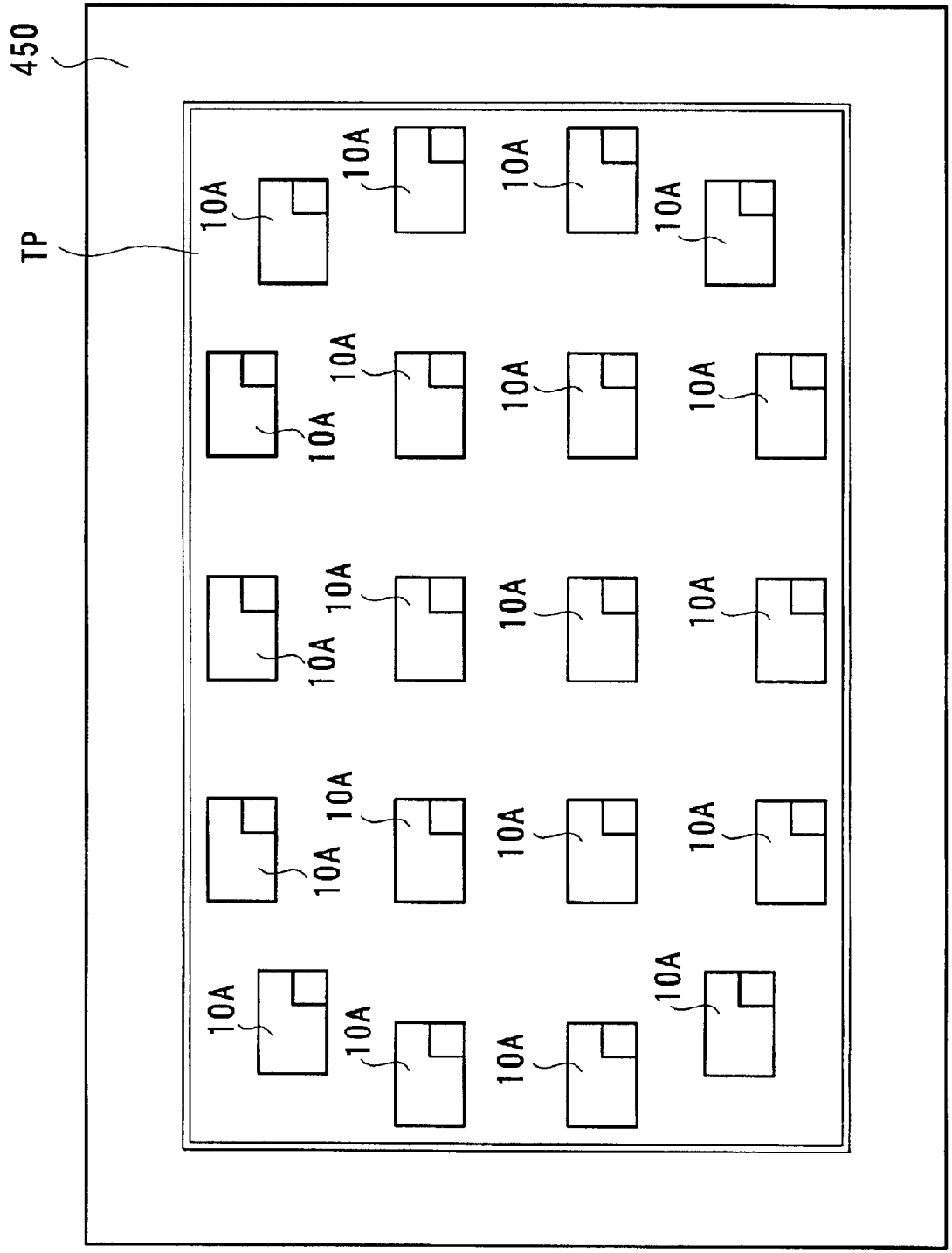
FIG. 8 is a front elevational view showing the check sheet of the aforesaid embodiment.

The test pattern TP has, as shown in front elevational view of FIG. 8, a plurality of resolution-measuring test patterns 10A, which can measure the resolution at a plurality of locations in the projection area based on the irradiated light from the projection lens 160. Incidentally, though not shown, a plurality of test patterns for checking the other optical properties of the projection lens 160 are formed in the test patterns TP. Specifically, test pattern for focus and alignment adjustment and test pattern for flare and chromatic aberration may be formed as the test patterns for checking the other optical properties, which may respectively has test patterns for visual check and automatic check.

Figure 9:
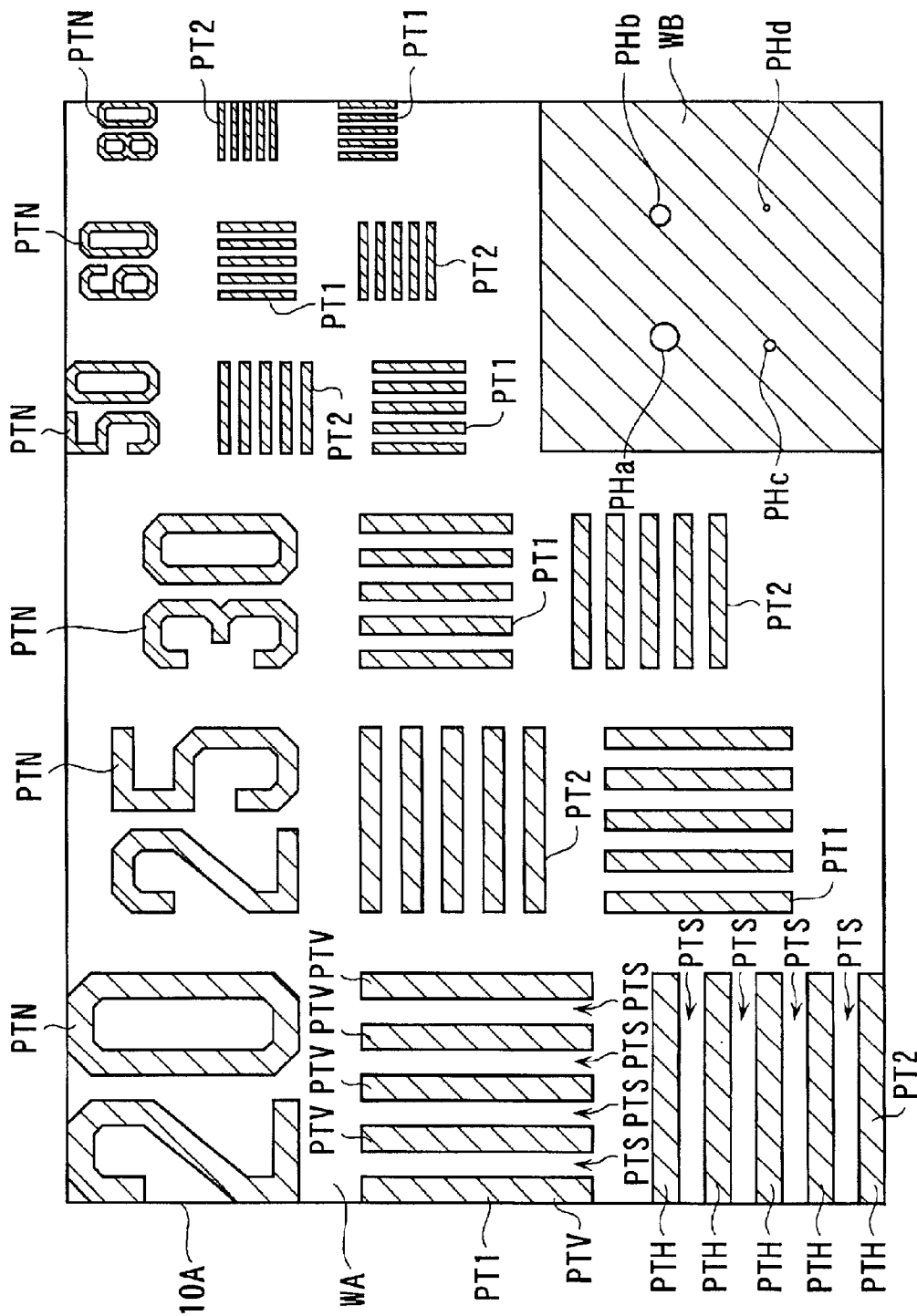
FIG. 9 is a front elevational view showing a pattern for measuring resolution contained in the check sheet of the aforesaid embodiment.

As shown in FIG. 9, the resolution-measuring test pattern 10A is formed in rectangular shape of predetermined vertical and horizontal dimensions (e.g. 795 μm*1074 μm), which is further divided into resolution-measuring area WA and flare check area WB.

The resolution-measuring area WA has a plurality of two resolution-measuring patterns PT1 and PT2. The pattern PT1 is formed by light-shielding areas PTV extending in perpendicular direction being spaced apart with each other, where light-transmissive area PTS is formed between the light-shielding areas PTV adjacent with each other. On the other hand, the pattern PT2 is formed by disposing horizontally-extending light-shielding areas PTH being spaced apart with each other, where the light-transmissive areas PTS are formed between the light-shielding areas PTH in the same manner as the pattern PT1.

The size of the patterns PT1 and PT2 corresponds to numerals PTN formed on the upper portion thereof. The numeral PTN represents a resolution index for visual check, which specifically represents spatial frequency of patterns PT1 and PT2 disposed below the respective figures. For instance, the two patterns PT1 and PT2 located below "20" are patterns of 20 line/mm spatial frequency and two patterns PT1 and PT2 below the numeral "30" are of 30 line/mm spatial frequency.

When the resolution is visually checked by the patterns PT1 and PT2, the checker observes the patterns PT1 and PT2 irradiated from the projection lens 160 and formed on the screen 500 and uses the limit special frequency capable of discriminating the border between the light-shielding area and the light-transmissive area as the resolution index. Another arrangement where the image is processed with an image sensor will be described below.

The flare check area WB is formed in rectangular shape of predetermined vertical and horizontal dimensions (e.g. 330 μm*340 μm), in which four types of small-hole patterns PHa to PHd as substantial circular light-transmissive area are included. The small-hole patterns PHa to PHd have respectively different diameters. For instance, the diameter of the small-hole pattern PHa is 26 μm, the diameter of the small-hole pattern PHb is 19 μm, the diameter of the small-hole pattern PHc is 10 μm and the diameter of the small-hole pattern PHd is 5 μm. The flare check area WB is used for automatic measurement of the projection lens evaluating apparatus, which identifies flare amount based on the difference between the hole diameter of the respective small-holes and the image area of the light transmitted therethrough.

In FIG. 6, the check sheet holder 440 is fixed to the six-axis adjustor 460. The disposition of the check sheet holder 440 is adjusted by controlling the six-axis adjuster 460. The six-axis adjuster 460 is a combination of six movable stages capable of parallel movement in S-, T- and U-directions and rotation around S-axis, T-axis and U-axis. The spatial disposition of the check sheet 450 held by the check sheet holder 440 can be adjusted by controlling the six-axis adjuster 460. In other words, the spatial disposition of the test pattern TP can be adjusted by controlling the six-axis adjuster 460.

The dummy prism 470 is, as described above, provided for imitating the cross dichroic prism 150 of the projector 100 in FIG. 4. The cross dichroic prism 150 shown in FIG. 4 has "X" shape thin film provided therein for combining the light irradiated from the three liquid crystal panels 141R, 141G and 141B. However, since the thin film is not required in the present evaluating apparatus, rectangular solid glass body similar to the cross dichroic prism 150 formed with a reflection-preventing coating is used as the dummy prism 470.

The projection lens 160 to be measured is sequentially exchanged and mounted to the evaluating apparatus.

According to the above arrangement of the projecting portion 400, the light irradiated from the light source 410 (FIG. 6) is reflected by the first and the second mirrors 430 and 442. The light reflected by the second mirror 442 is irradiated as a image light representing the image of the image area TP by passing the check sheet 450. The image light passes through the dummy prism 470 and is, subsequently, projected by the projection lens 160.

Incidentally, as shown in FIG. 5, the central axis n1 of the projection lens and a normal line n2 passing the center of the check sheet 450 are shifted by a predetermined distance in the projecting portion 400 of the present embodiment. This is so arranged for imitating "upward projection" of the projector. The projection lens 160 is designed to project and display an image without distortion during the upward projection. Incidentally, the projection where the central axis n1 of the projection lens 160 and the normal line n2 passing the center of the check sheet 450 do not coincide is ordinarily called as the "upward projection".

The measuring portion 600 of FIG. 5 has a processing portion 610, four adjusting CCD cameras 620a to 620d disposed adjacent to four corners of the screen 500 and a single measuring CCD camera 640. The processing portion 610 is electrically connected with the adjusting CCD cameras 620a to 620d and the measuring CCD camera 640 and is also electrically connected with the six-axis adjuster 460. The processing portion 610 analyzes the image data obtained by the adjusting CCD cameras 620a to 620d and controls the six-axis adjuster 460 based on the analysis result thereof. As described above, the spatial disposition of the image area TP is adjusted by controlling the six-axis adjuster 460, thereby adjusting image focus. Further, the processing portion 610 processes the image data obtained by the measuring CCD camera 640 to calculate the property values of the projection lens.

As will be apparent by the above description, the processing portion 610 of the present embodiment corresponds to the signal processor of the present invention and the measuring CCD camera corresponds to the image sensor. Incidentally, though not shown, the adjusting CCD cameras 620a to 620d and the measuring CCD camera 640 has a light adjuster for adjusting the amount of the received light. The amount of the received light is reduced by narrowing the diaphragm of the light adjuster at a bright part of the projected image, and the amount of the received light is increased by widening the diaphragm of the light adjuster at a dark part of the projected image. The light adjuster also functions as an adjuster for maintaining linearity between the luminance of the incident light on the CCD cameras 620a to 620d and 640 and the output signal.

Figure 10:
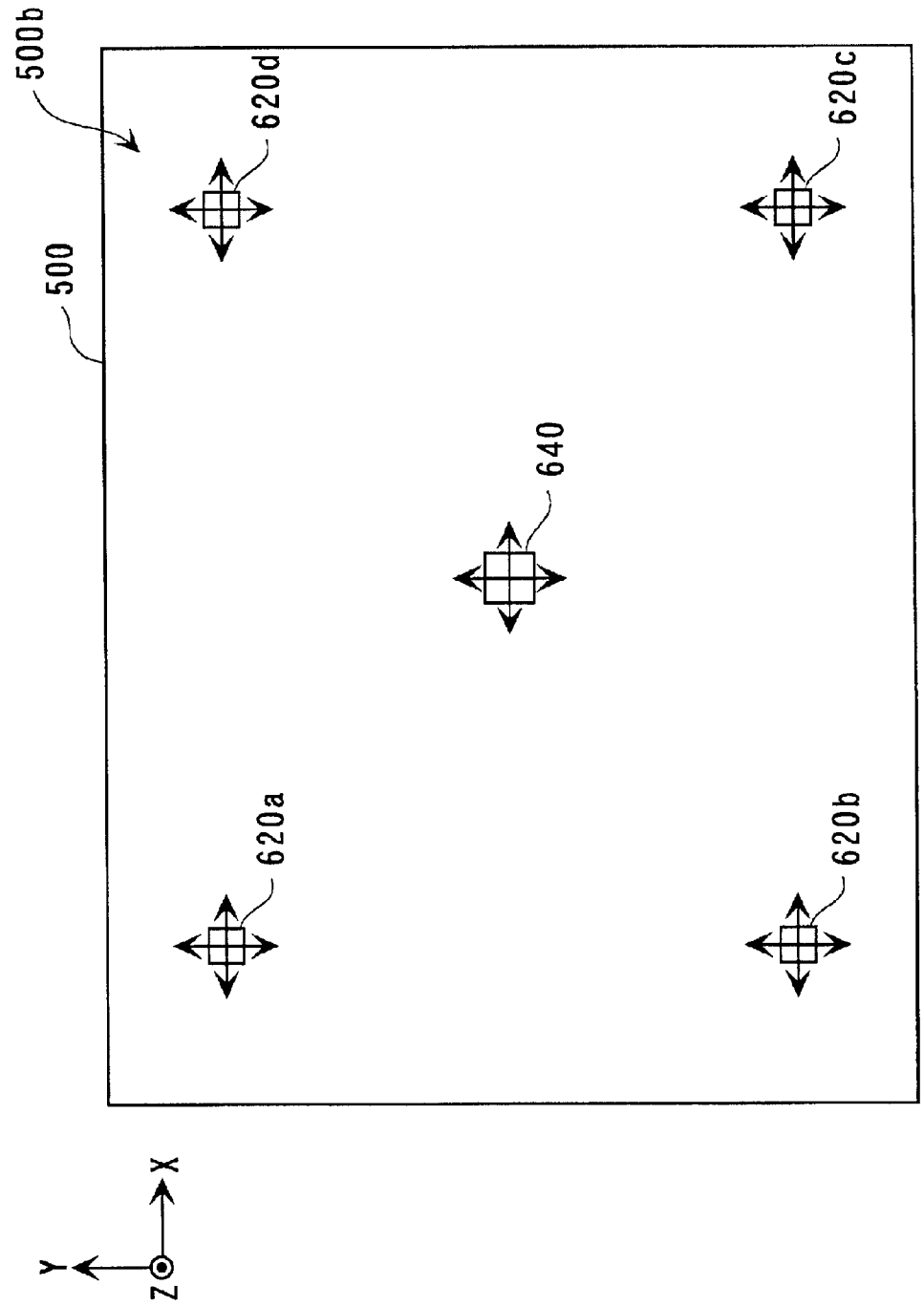
FIG. 10 is a front elevational view showing a disposition of an image sensor on the screen of the aforesaid embodiment.

FIG. 10 is an illustration showing a disposition of the adjusting CCD cameras 620a to 620d and the measuring CCD camera 640 when the screen 500 is seen from +Z direction. As illustrated, the four adjusting CCD cameras 620a to 620d are respectively located on four corners of the screen 500 and are movable on the XY plane by a moving mechanism (not shown). The measuring CCD camera 640 is provided around the center of the screen 500 and is movable on the XY plane by a moving mechanism (not shown). However, as shown in FIG. 5, the measuring CCD camera 640 is shifted in +Z direction from the respective adjusting CCD cameras 620a to 620d, the measuring CCD camera 640 can be moved without interfering with the respective adjusting CCD cameras 620a to 620d. The adjusting CCD cameras 620a to 620d and the measuring CCD camera 640 are connected with a below-described computer including the processing portion 610 through a video-capturing board (not shown). The image of the image area TP displayed on the screen 500 is taken by the CCD cameras 620a to 620d and 640 and is converted into an image signal for computer by the video-capturing board to be processed by a computer.

The processing portion 610 as the resolution evaluation value calculating means is constructed as a program operated on an OS for controlling a CPU of a computer including the CPU (Central Processing Unit) and a hard-disk, which includes, though not illustrated, a background luminance value acquiring portion, a maximum luminance value acquiring portion, a minimum luminance value acquiring portion and an evaluation value calculating portion in the present embodiment. The processing portion 610 sends a control signal to the light adjuster of the adjusting CCD cameras 620a to 620d based on the image data from the adjusting CCD cameras 620a to 620d to control the amount of received light of the adjusting CCD cameras 620a to 620d, sends another control signal based on the image data detected by the measuring CCD camera 640 to adjust the amount of received light of the measuring CCD camera1 640, and calculates the resolution evaluation value.

(3) Evaluation Method of Projection Lens

Next, evaluation method of resolution of the projection lens 160 using the above projection lens evaluating apparatus will be described below.

Prior to measuring the resolution by the evaluating apparatus, the position and focus of the projected image on the screen 500 have to be adjusted. The position adjustment and focus adjustment of the projected image are conducted by the processing portion 610 by taking the image formed on the screen 500 corresponding to the position-adjusting pattern (not shown in FIG. 8) formed on the four corners of the projection lens check sheet 450 with the adjusting CCD cameras 620a to 620d.

When an on-focus image is formed on a predetermined position on the screen 500 after completing the focus adjustment and the position adjustment, the resolution is measured based on the image.

Figure 11:
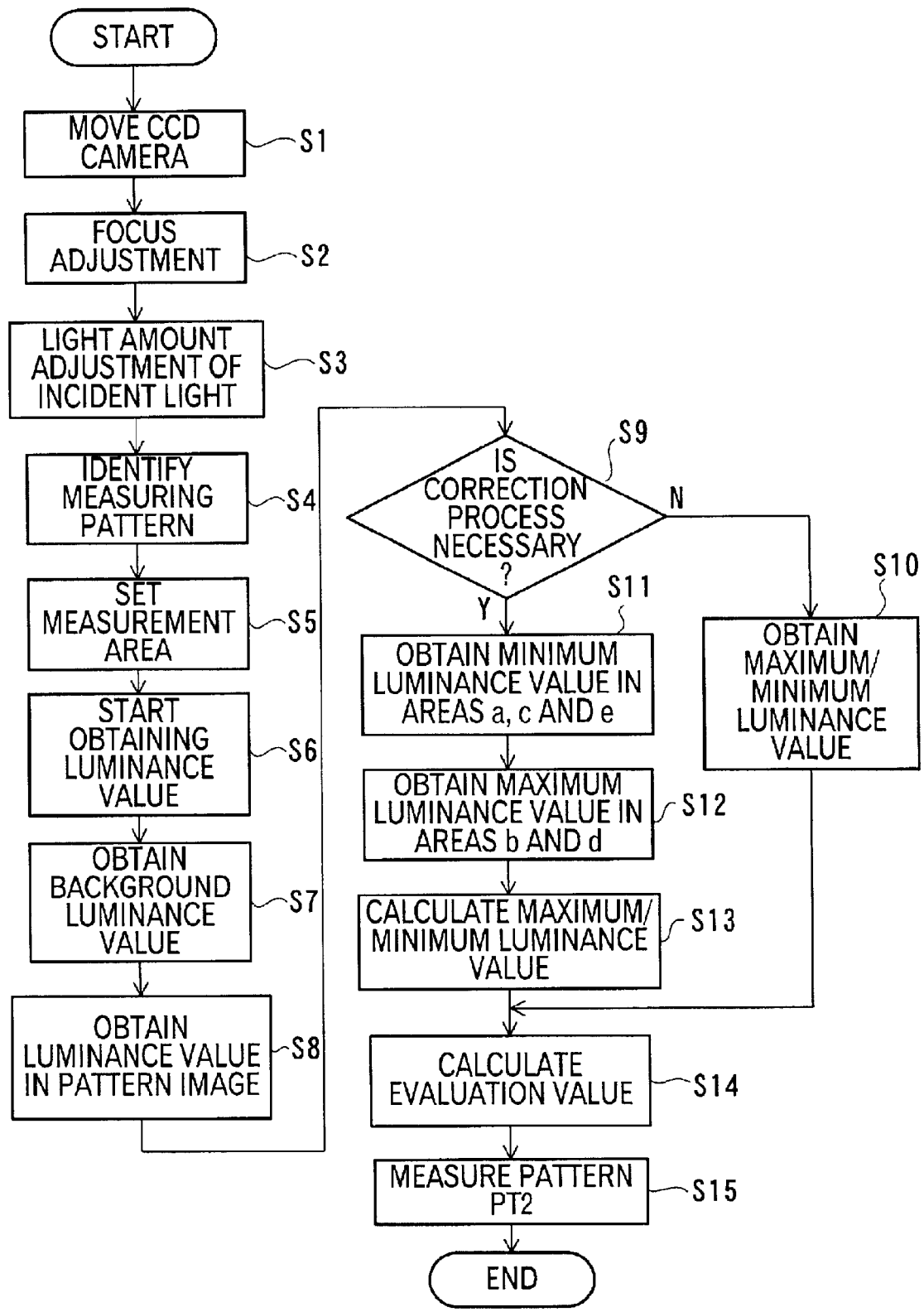
FIG. 11 is a flowchart showing lens evaluation method of the aforesaid embodiment.

The resolution is measured according to the flowchart shown in FIG. 11, which specifically is conducted according to the following steps.

(1) The measuring CCD camera 640 is moved to a position capable of detecting the image of the resolution-measuring test pattern 10A based on the control signal from the processing portion 610 (step S1), and the measuring CCD camera 640 is focused (step S2) and the light amount of the light incident on the image sensor inside the measuring CCD camera 640 is adjusted (step S3). Incidentally, the light amount adjustment is conducted for measuring at a portion having a proportional output of the CCD camera 640 relative to the detected luminance value.

(2) Next, the processing portion 610 identifies the pattern PT1 for calculating the resolution evaluation value (step S4). The identification is conducted by a pattern-matching process as one of the image processing, where the same pattern as a reference pattern BP stored in the hard-disk is found out of a plurality of patterns PT1 displayed in the image D1 taken by the measuring CCD camera 640 as shown in FIG. 12.

(3) The position of pattern center B0 and an area B1 based on the pattern center B0 are set on the reference pattern BP. As a result of the pattern matching process, the position of the central coordinates A0 corresponding to the pattern center B0 of the reference pattern BP is returned and a measurement area A1 is set based thereon (step S5).

(4) Acquiring the luminance value of the image in the measurement area Al set during the step S5 is initiated (step S6). Incidentally, the image processing in the processing portion 610 in the present embodiment has a image luminance represented by 256 scales, where the darkest portion has value of 0 and the brightest portion has value of 255.

(5) Initially, the check sheet 450 is slightly moved to shift the pattern PT1 on the outside of the measuring area A1 and the luminance value Io is obtained by measuring the image inside the measuring area A1 on the background portion (step S7: background luminance value acquiring step). Incidentally, the luminance value Io is acquired by taking the value averaging the luminance value at all of the measuring points in the measuring area A1 and the luminance value Io is stored in a memory constituting the processing portion 610.

(6) Next, the pattern PT1 is returned to the measuring area A1 to measure the luminance value in the image of the pattern PT1 taken by the measuring CCD camera 640 (step S8). Specifically, when the luminance value of the pattern PT1 shown in FIG. 12 is acquired, the luminance value detected by a single picture element line along the extending direction of the light-shielding area PTV is integrated and the integrated value is divided and averaged by the integrated picture element number to calculate the value representing the luminance value of the single picture element line along the extending direction of the light-shielding area PTV. The process is repeated in the alignment direction of the light-shielding area and the light-transmissive area PTS, in other words, in L direction in FIG. 12 to obtain a representative value of the luminance value of the light-shielding area PTV in the measuring area A1 and the light-transmissive area PTS in the light-shielding area PTV.

Figure 13:
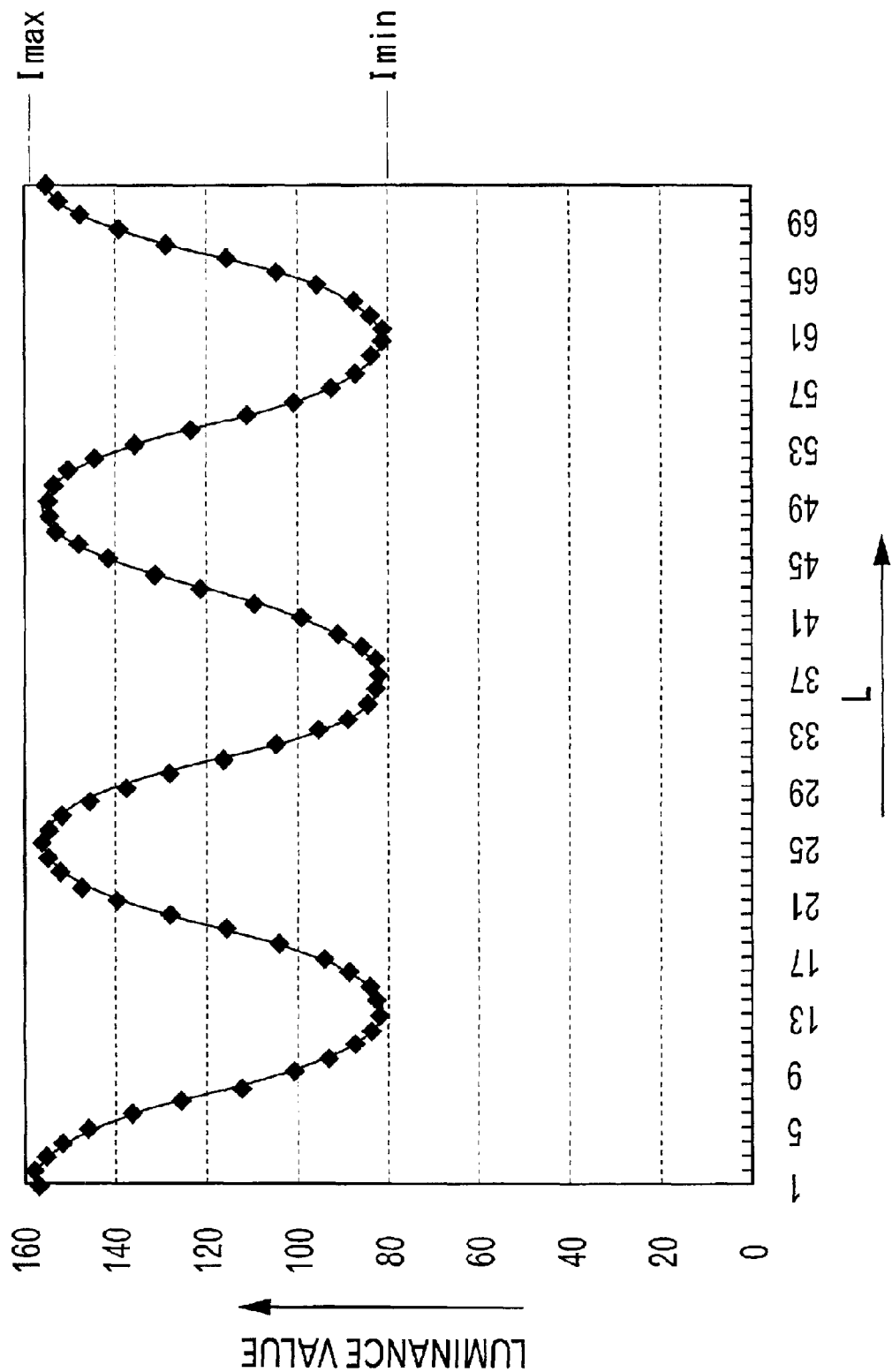
FIG. 13 is a graph for obtaining resolution evaluation value in the lens evaluation method of the aforesaid embodiment.

(7) The processing portion 610 judges whether the second correction process is required based on the representative value of the luminance value in the obtained respective lines (step S9). In other words, when the brightness of the background in the measuring area A1 is uniform, the distribution of the luminance value along the alignment direction of the light-shielding area PTV and the light-transmissive area PTS, i.e. the maximum luminance value Imax and the minimum luminance value Imin, is uniform as shown in the graph of FIG. 13, so that the maximum luminance value Imax and the minimum luminance value Imin in FIG. 13 are acquired without correcting process (step S10: maximum luminance value acquiring step, minimum luminance value acquiring step).

Figure 14:
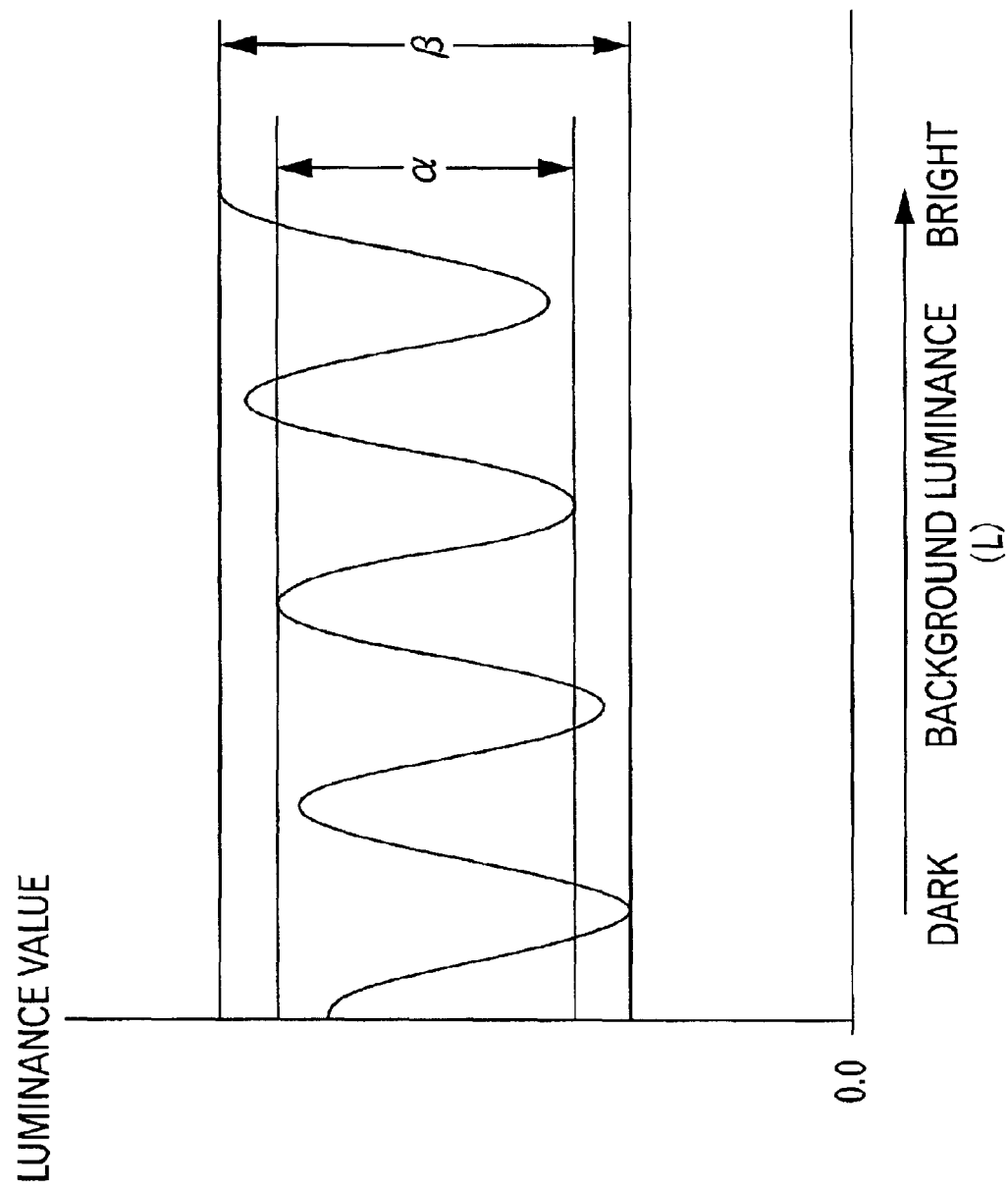
FIG. 14 is a graph for obtaining resolution evaluation value in the lens evaluation method of the aforesaid embodiment.
Figure 15:
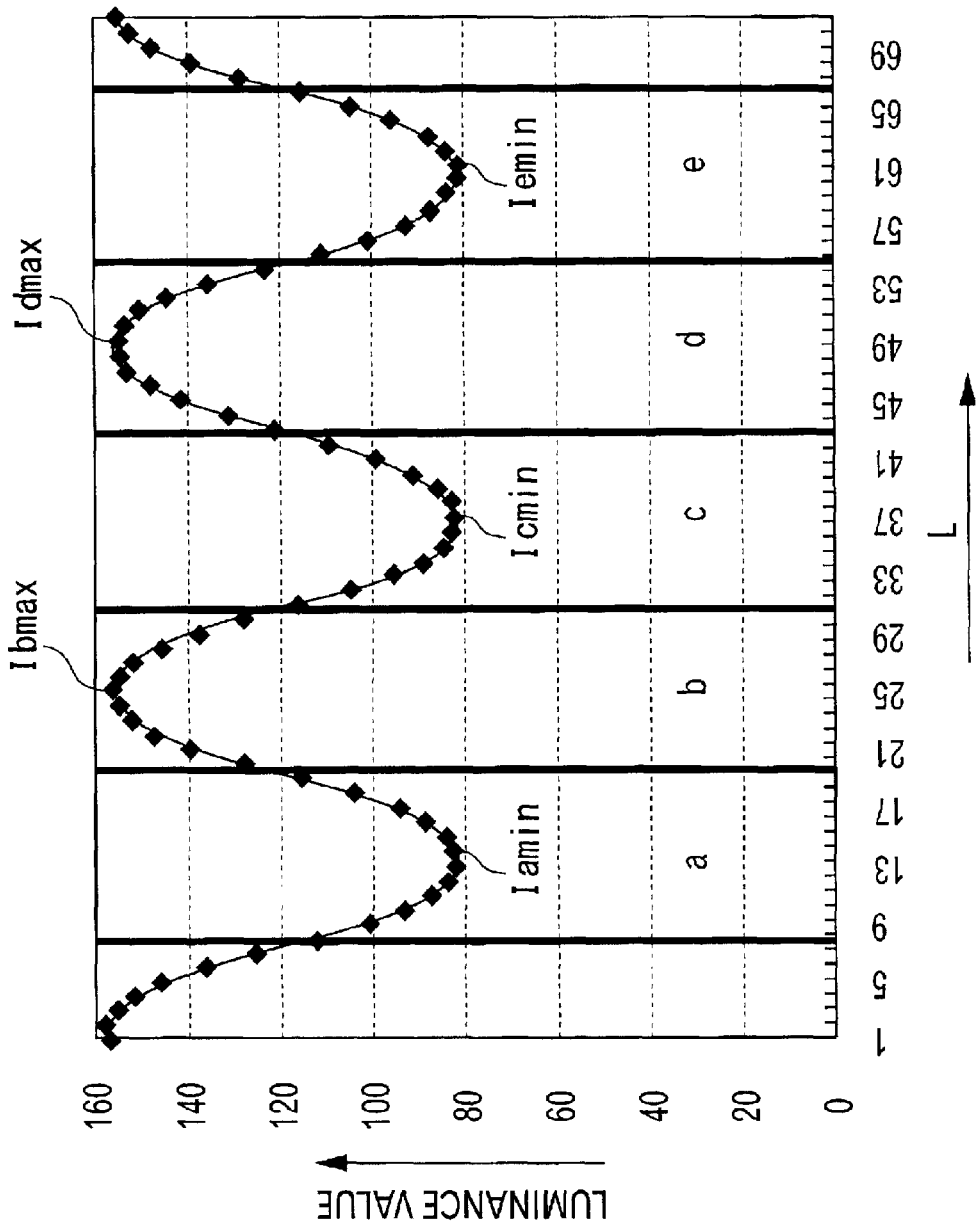
FIG. 15 is a graph for obtaining resolution evaluation value in the lens evaluation method of the aforesaid embodiment.

(8) On the other hand, when the brightness of background in the measurement area A1 is not uniform, the distribution of the luminance value is arranged so that the background luminance value becomes greater toward the center of the projected image, where the maximum and minimum luminance values may be gradually increased in the measurement area A1 in accordance with the change in background luminance value as shown in the graph of FIG. 14. In this case, when the maximum and minimum luminance values are defined in the range of β, the change in the background luminance value is ignored and accurate minimum and maximum luminance values cannot be obtained. Accordingly, in order to obtain the maximum and minimum luminance values in a more appropriate range of α, the processing portion 610 separates the inside of the measurement area A1 in areas a to e as shown in a graph of FIG. 15, where the minimum luminance values Iamin, Icmin and Iemin within the areas a, c and e including the minimum luminance value (step S11) are obtained and the maximum luminance values Ibmax and Idmax within the areas b and d including the maximum luminance value are obtained (step S12).

(9) When the minimum luminance values Iamin, Icmin and Iemin and maximum luminance values Ibmax and Idmax are obtained for respective areas a to e, the processing portion 610 assigns the values of the minimum and maximum luminance values within the respective areas in following formulae [9] and [10] to obtain the maximum luminance value Imax and minimum luminance value Imin (step S13: maximum luminance value acquiring step, minimum luminance value acquiring step).

$$Imax=(Ibmax+Idmax)/2 \quad [9]$$

$$Imin=(Iamin+Icmin+Iemin)/3 \quad [10]$$

Incidentally, the number of denominator in formulae (9) and (10) is set in accordance with the respective numbers of the area including the maximum luminance value and the area including the minimum luminance value within the separated areas a to e, where the value of the denominator and numerator changes in accordance with change in the spatial frequency of the resolution-measuring pattern PT1.

(10) When the background luminance value Io, the maximum luminance value Imax and minimum luminance value Imin are obtained in the above manner, the processor calculates the resolution evaluation value MTF based on the following formula [11] (step S14: evaluation value calculating step).

$$MTF=(Imax-Imin)/(Io*2-Imax-Imin) \quad [11]$$

(11) In the same manner as the above, the luminance value and the resolution evaluation value are calculated for the pattern PT2 (step S15), and the same measurement and evaluation value calculation are repeated for all of the test patterns 10A in the test pattern TP shown in FIG. 7.

(4) Advantage of Embodiment

According to the above-described present embodiment, following advantages can be obtained.

(1) Since the lens evaluation method of the present embodiment has the background luminance value acquiring step S7, the maximum luminance value acquiring step and the minimum luminance value acquiring step S10 and S13, the resolution evaluation value MTF can be calculated based on the background luminance value Io, the maximum luminance value Imax and the minimum luminance value Imin. Further, when the brightness of the image projected on the screen 500 differs, the correction processing is conducted considering the background luminance value Io, so that the resolution evaluation value MTF calculated based on the maximum luminance value Imax and the minimum luminance value Imin obtained at a plurality of locations can be evaluated according to the same standard. Accordingly, the resolution of the projection lens 160 can be appropriately evaluated without being influenced by the type of the projection lens 160 to be evaluated and the position of the resolution-measuring test pattern 10A displayed on the screen 500.

Figure 16:
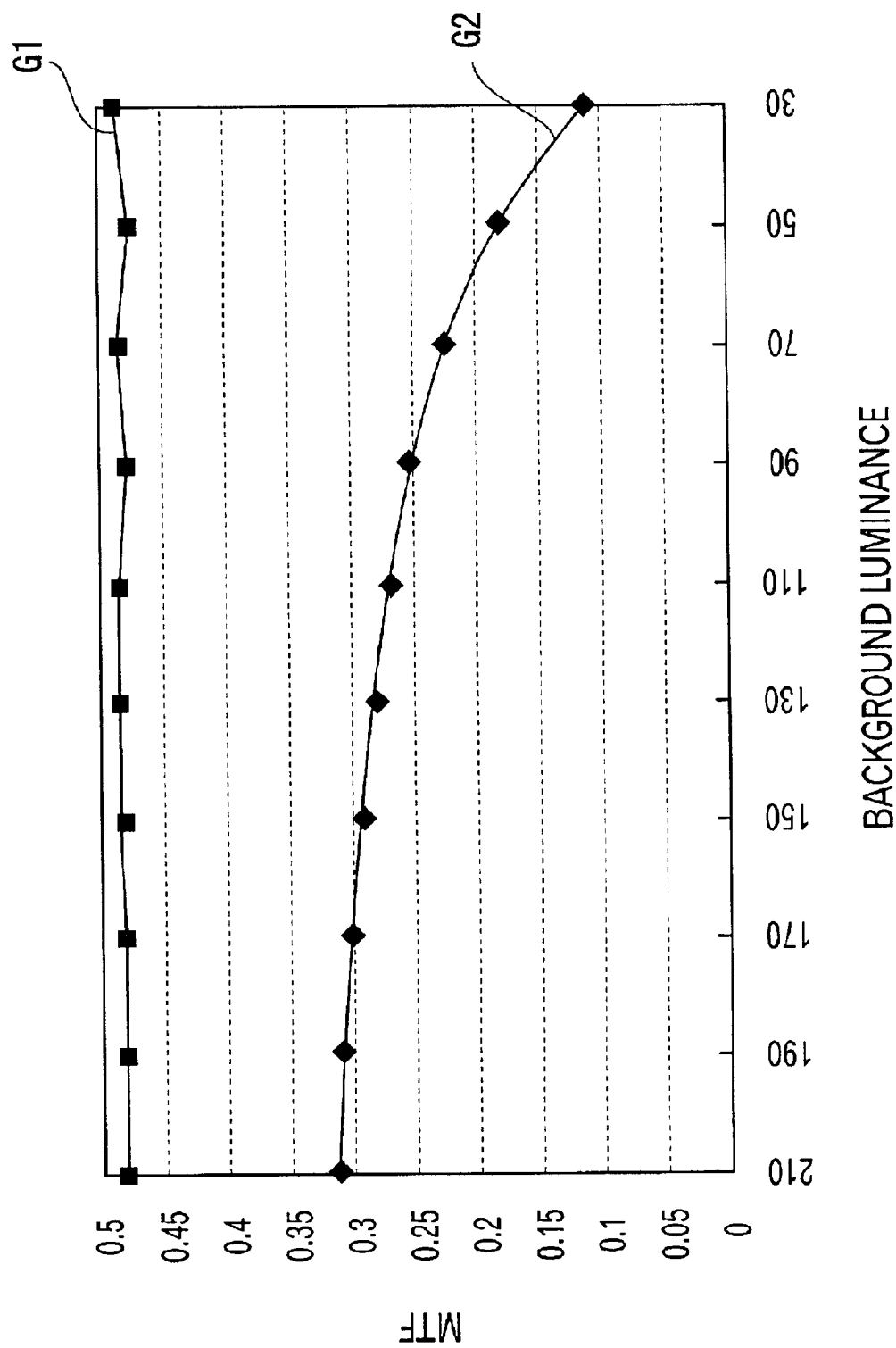
FIG. 16 is a graph comparing resolution evaluation value obtained by the aforesaid embodiment and resolution evaluation value obtained by a conventional method.

(2) Since the resolution evaluation value MTF can be calculated by the formula [15], accurate resolution evaluation value MTF can be obtained. When the change in the resolution evaluation value MTF in accordance with the change in the background luminance value is compared with the conventional arrangement, as shown in FIG. 16, the change in the resolution evaluation value MTF can be illustrated as graph G1, from which it is apparent that the change in the resolution evaluation value is not influenced by the change in the background luminance value. On the other hand, according to the conventional calculation method of resolution evaluation value MTF based on the following formula [12], the change can be shown as in the graph G2, from which it can be understood that the resolution evaluation value MTF greatly changes in accordance with change in background luminance value.

$$MTF=(Imax-Imin)/(Imax+Imin) \quad [12]$$

(3) Since the light adjuster is provided to the adjusting CCD cameras 620a to 620d and the measuring CCD camera 640, the amount of light incident on the CCD cameras 620a to 620d and 640 can be measured at a portion having the proportional CCD output relative to the input luminance value, so that the maximum luminance value Imax and the minimum luminance value Imin can be accurately obtained and the resolution evaluation value MTF can be further accurately calculated.

(4) Since the steps S11 and S12 as, say, second correcting process are provided in obtaining the luminance value, even when the background luminance value Io is changed within the measurement area A1, the maximum luminance value Imax and the minimum luminance value Imin difficult to be influenced by the change can be obtained, so that the resolution evaluation value MTF can be further accurately calculated.

[2. Second Embodiment]

Next, the second embodiment of the present invention will be described below.

In the following description, the same reference numeral will be attached to the same structure and components as the first embodiment and detailed explanation thereof will be omitted or simplified.

The evaluation apparatus of projection lens in the above first embodiment uses resolution-measuring test pattern 10A formed on the check sheet 450 to calculate the resolution evaluation value MTF of the projection lens 160 by the resolution evaluation calculator of the processing portion 610 composed of the background luminance value acquiring portion, the maximum luminance value acquiring portion and the minimum luminance value acquiring portion.

On the other hand, the evaluation apparatus of the projection lens according to the present embodiment differs from the above arrangement in that distortion aberration of the projection lens and distribution of in-plane illumination of the projected image can be evaluated as well as evaluating the resolution of the projection lens.

Figure 17:
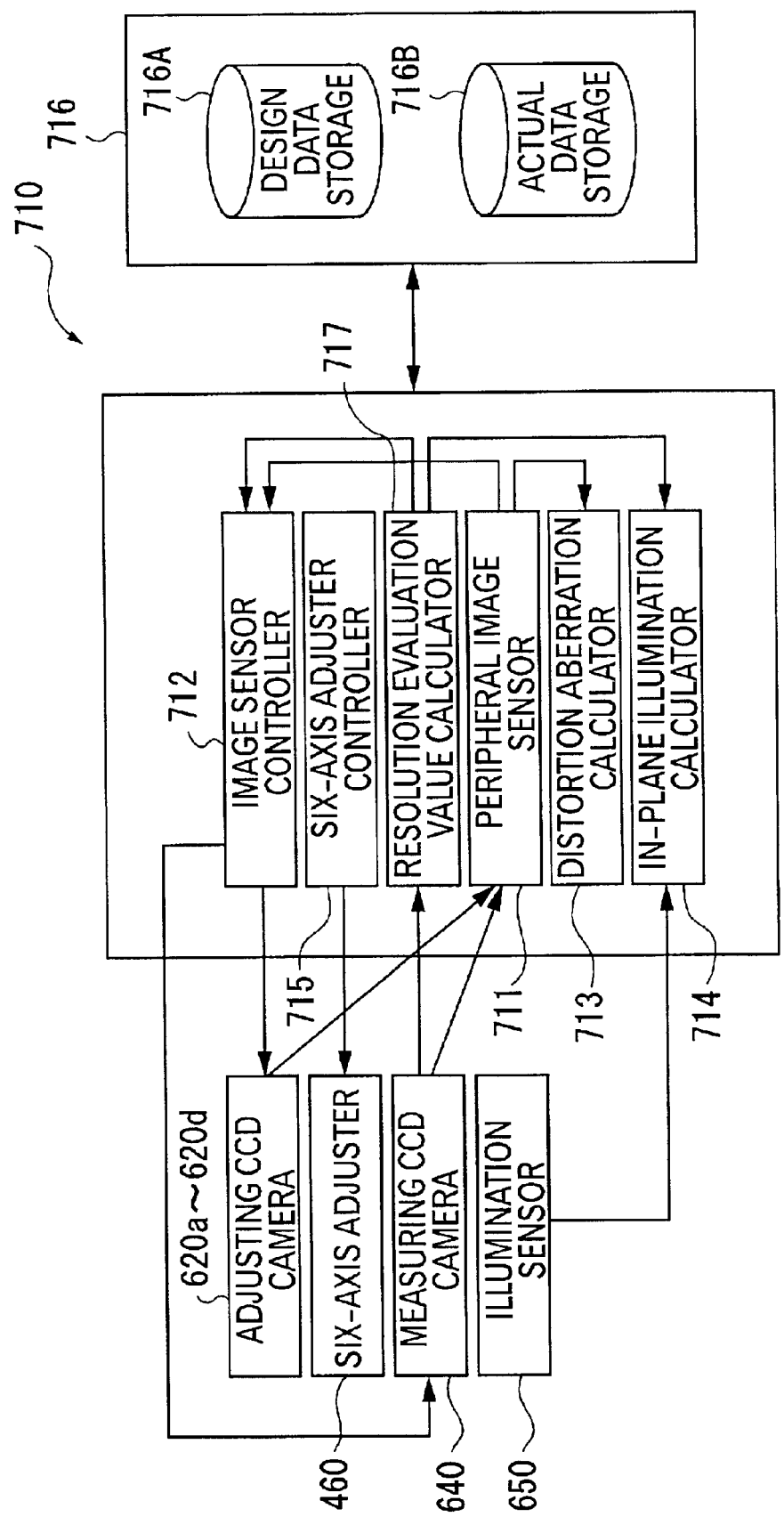
FIG. 17 is a block diagram showing a control structure of a processor according to second embodiment of the present invention.
Figure 18:
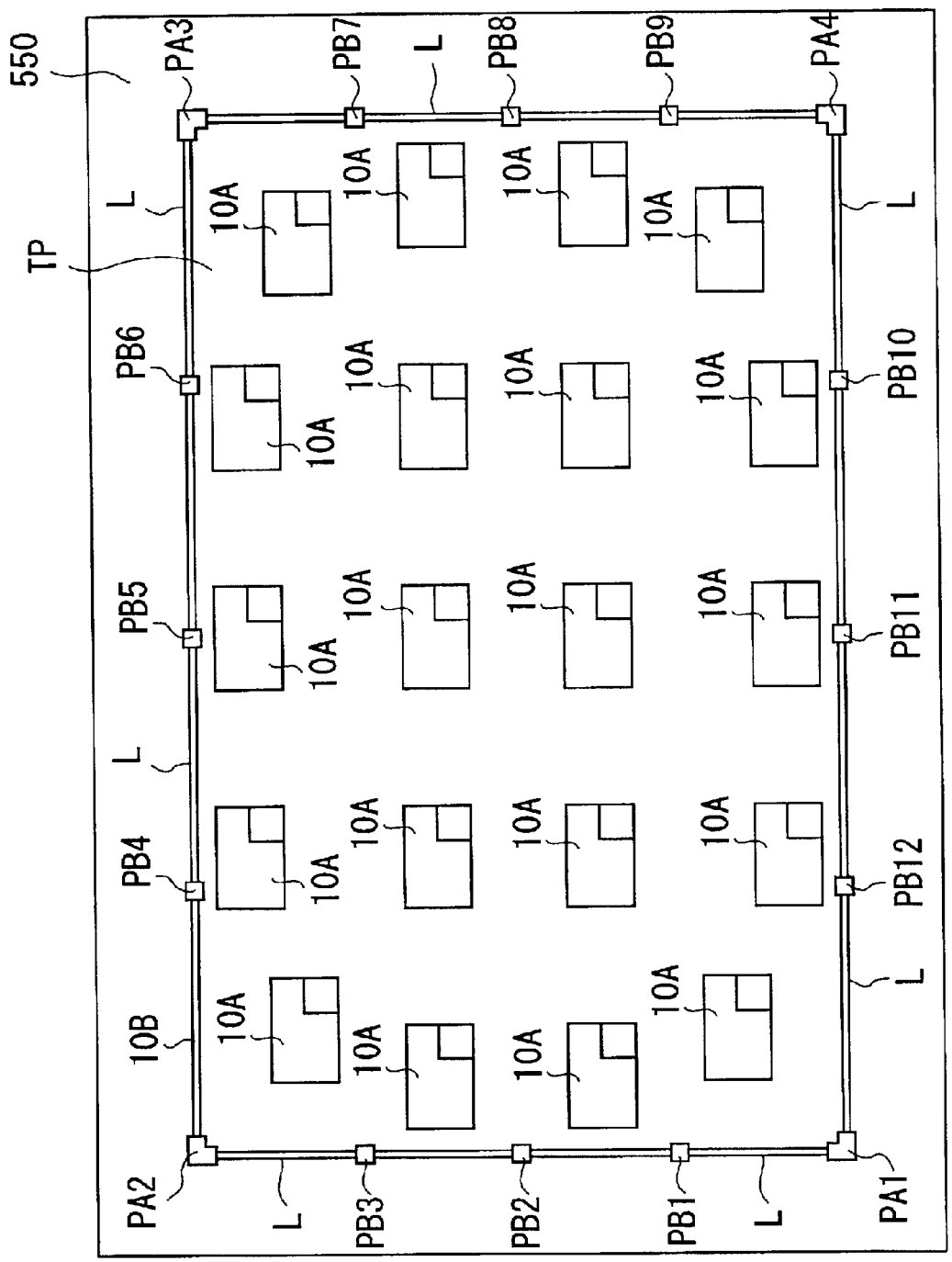
FIG. 18 is a front elevational view showing a check sheet according to the aforesaid second embodiment.

For this purpose, the processing portion 710 has a peripheral image sensor 711, a image sensor controller 712, a distortion aberration calculator 713, an in-plane illumination calculator 714, a six-axis adjuster controller 715, a storage 716 and a resolution evaluation value calculator 717 as shown in FIG. 17.

Specifically, the peripheral image sensor 711 is a portion for detecting a peripheral image of the projected image taken by the adjusting CCD cameras 620a to 620d and the measuring CCD camera 640 through an image import device as an image signal suitable for a computer, which outputs the detected image signal to the distortion aberration calculator 713 and outputs a signal to the image sensor controller 712 indicating that border area of the projected image can be determined.

The image sensor controller 712 is a portion for controllably moving the adjusting CCD cameras 620a to 620d to an initial position corresponding to the projected image and for controllably moving the measuring CCD camera 640 along the outer periphery of the projected image, which sequentially moves the measuring CCD camera 640 along the outer periphery of the projected image triggered by termination of detection of the image signal by the peripheral image sensor 711. Incidentally, the moving mechanism of the CCD camera 640 has a pulse motor into which a control signal of pulse step number in accordance with movement is applied by the image sensor controller 712 to move the measuring CCD camera 640 to a predetermined position.

The distortion aberration calculator 713 is a portion for calculating the distortion aberration of the projected image in accordance with the image signal from the peripheral image sensor 711. Though specifically described below, the distortion aberration calculator 713 obtains a border line between a projection area detected by the peripheral image sensor 711 and the other part based on the image signal from the peripheral image sensor 711 and the outer circumference of the projected area is identified from the position of the border line, whereby a difference relative to the designed border position of the projected image is calculated to obtain distortion aberration.

The six-axis adjuster controller 715 outputs a control signal to the six-axis adjuster 460 to adjust the position of the check sheet 550 when the projected image is out of focus, where the image taken by the adjusting CCD cameras 620a to 620d is checked by pattern-matching to find a test pattern formed on the check sheet 550. Using a specific index value (edge intensity) of the test pattern of the pictured image data, whether the image is on focus or not is determined and focus condition can be examined.

Though not shown, the resolution evaluation value calculator 717 has an input level calculator as well as the background luminance value acquiring portion, the maximum luminance value acquiring portion and the minimum luminance value acquiring portion.

The input level calculator is a portion for calculating an input level based on the luminance value obtained by the background luminance value acquiring portion, the maximum luminance value acquiring portion and the minimum luminance value acquiring portion.

Specifically, the input level calculator calculates the input level value Ii according to the following formula [13].

$$Ii = Io*2 - Imax - Imin \qquad [13]$$

The in-plane illumination calculator 714 is a portion for calculating the in-plane illumination of the projected image, which obtains illumination value from the signal outputted from the illumination sensor 650 to store the value in a memory parallelizing the input level value of the portion having obtained the illumination value and calculates the illumination of respective positions based on the input level value of the other portions to recognize the in-plane illumination of the whole projected image.

The storage 716 has an actual data storage 716A for storing the evaluation value calculated by the resolution evaluation value calculator 717, the distortion aberration calculator 713 and the in-plane illumination calculator 714 parallelizing with product number of the projection lens, and a design data storage 716B storing design data of various projection lenses in advance. The design data includes a designed disposition of the check sheet 550 and designed disposition of the projected image in accordance with focus distance of the various projection lenses to be checked, and designed evaluation value of the various projection lenses. The image sensor controller 712 and the six-axis adjuster controller 715 conduct adjustment from the designed disposition as an initial position, and the resolution evaluation calculator 717, the distortion aberration calculator 713 and the in-plane calculator 714 determine the quality of the projection lens based on the designed evaluation value.

In the evaluation apparatus of the projection lens of the present embodiment, the check sheet 550 has, as well as the twenty resolution-measuring test patterns 10A disposed at an approximately regular interval, a rectangular-frame light-shielding portion 10B surrounding the twenty resolution-measuring test patterns 10A, and the illumination sensor 650 disposed at a lower peripheral center of the image area on the screen. The projection lens 160 to be checked is arranged as a lens set having a plurality of light-condensers (not shown) disposed along an optical-axis direction, which can change the size of the projected image in three stages, i.e. wide (large), middle (medium) and tele (small), by changing the relative position of the respective light-condensers.

Specifically, the rectangular light-shielding portion 10B has four test patterns PA1 to PA4 disposed on four corners of the image area, twelve test patterns PB1 to PB12 disposed along the rectangular profile of the image area and sixteen parting line L disposed along the rectangular profile of the image area.

Figure 19A:
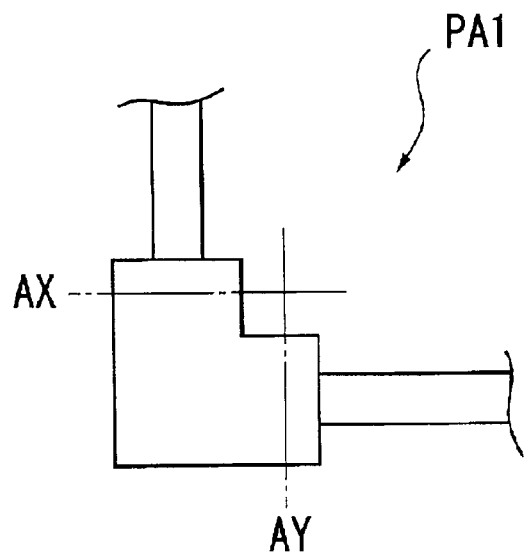
FIG. 19 is a front elevational view showing a test pattern contained in the check sheet of the aforesaid second embodiment.

As shown in FIG. 19(a), the test patterns PA1 to PA4 are light-shielding portions of approximate L-shape and respective images thereof are detected by the four adjusting CCD cameras 620a to 620d. The processing portion 710 identifies the position of the four corners of the light-shielding portion 10B based on the detected four images to evaluate the distortion of the projected image.

Figure 19B:
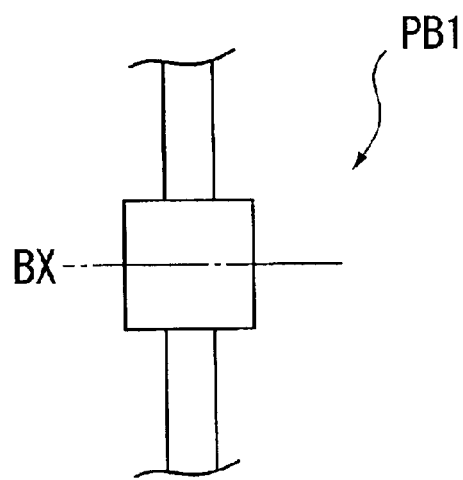

The test patterns PB1 to PB12 disposed along the rectangular profile of the image area are square light-shielding portions as shown in FIG. 19(b), and respective images are detected by the measuring CCD camera 640. The processing portion 710 identifies the position of the test patterns PB1 to PB12 and recognizes the outer profile of the light-shielding portion 10B as well as the position of the four corners of the light-shielding portion 10B, thereby calculating the distortion aberration.

As shown in FIG. 20, the illumination sensor 650 is disposed at a lower peripheral center of the image area on the screen, i.e. at a position corresponding to the illumination optical axis center of the projection lens 160 for upward projection, the illumination sensor 650 measuring the illumination of the test pattern 10A on the check sheet 550 displayed on the above position. The illumination sensor is shifted in +Z direction relative to the measuring CCD camera 640 on the screen, thereby avoiding interference with the measuring CCD camera 640.

Figure 21:
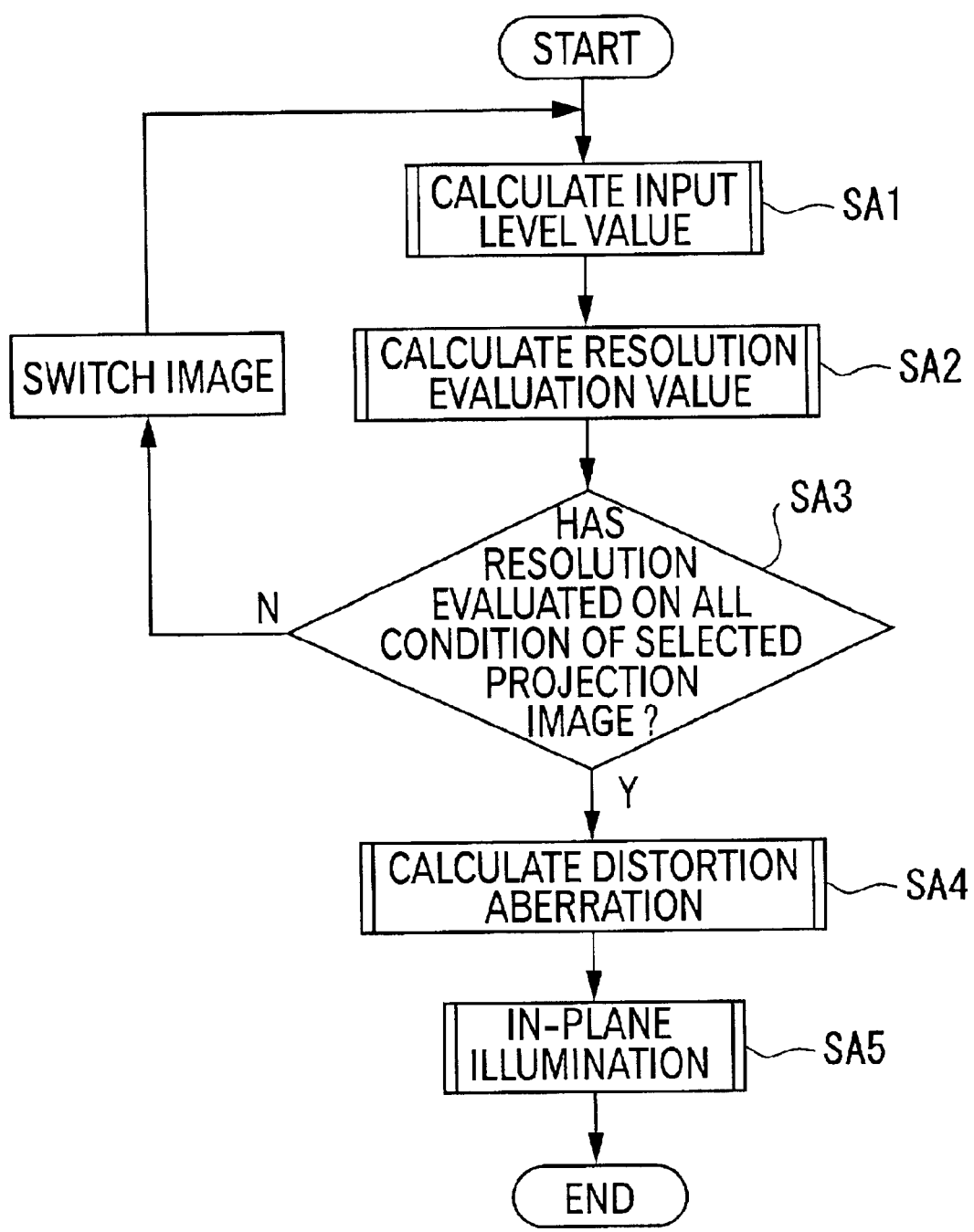
FIG. 21 is a flowchart showing a lens evaluation method according to the aforesaid second embodiment.

In the above arrangement, the evaluation method of the projection lens is implemented according to a flowchart shown in FIG. 21, which specifically is as follows.

(1) The resolution evaluation value calculator 717 calculates the input level and the resolution evaluation value on the test pattern 10A formed on the check sheet 550 and stores the calculated evaluation value into the actual data storage 716A of the storage 716 parallelizing with the position of the test pattern. Incidentally, the input level and the resolution evaluation value are calculated according to the flowchart shown in FIG. 11 as in the first embodiment. When the background luminance value Io, the maximum luminance value Imax and the minimum luminance value Imin are obtained, the resolution evaluation value calculator 717 calculates the input level value Ii according to following formula [14] (step SA1: input level value calculating step), and calculates resolution evaluation value MTF according to following formula [15] (step SA2: evaluation value calculating step).

$$Ii = Io*2 - Imax - Imin \quad [14]$$

$$MTF = (Imax - Imin)/Ii \quad [15]$$

(2) The operator judges whether resolution is evaluated on all of the conditions selected by setting initial parameters among the three conditions, i.e. wide (large), middle (medium) and tele (small) (step SA3). When the resolution is not evaluated on all of the conditions, the projected image is changed and the resolution evaluation value is re-calculated by the resolution evaluation value calculator 717. Incidentally, the resolution evaluation value is calculated by the order of wide (large), middle (medium) and tele (small).

Figure 22:
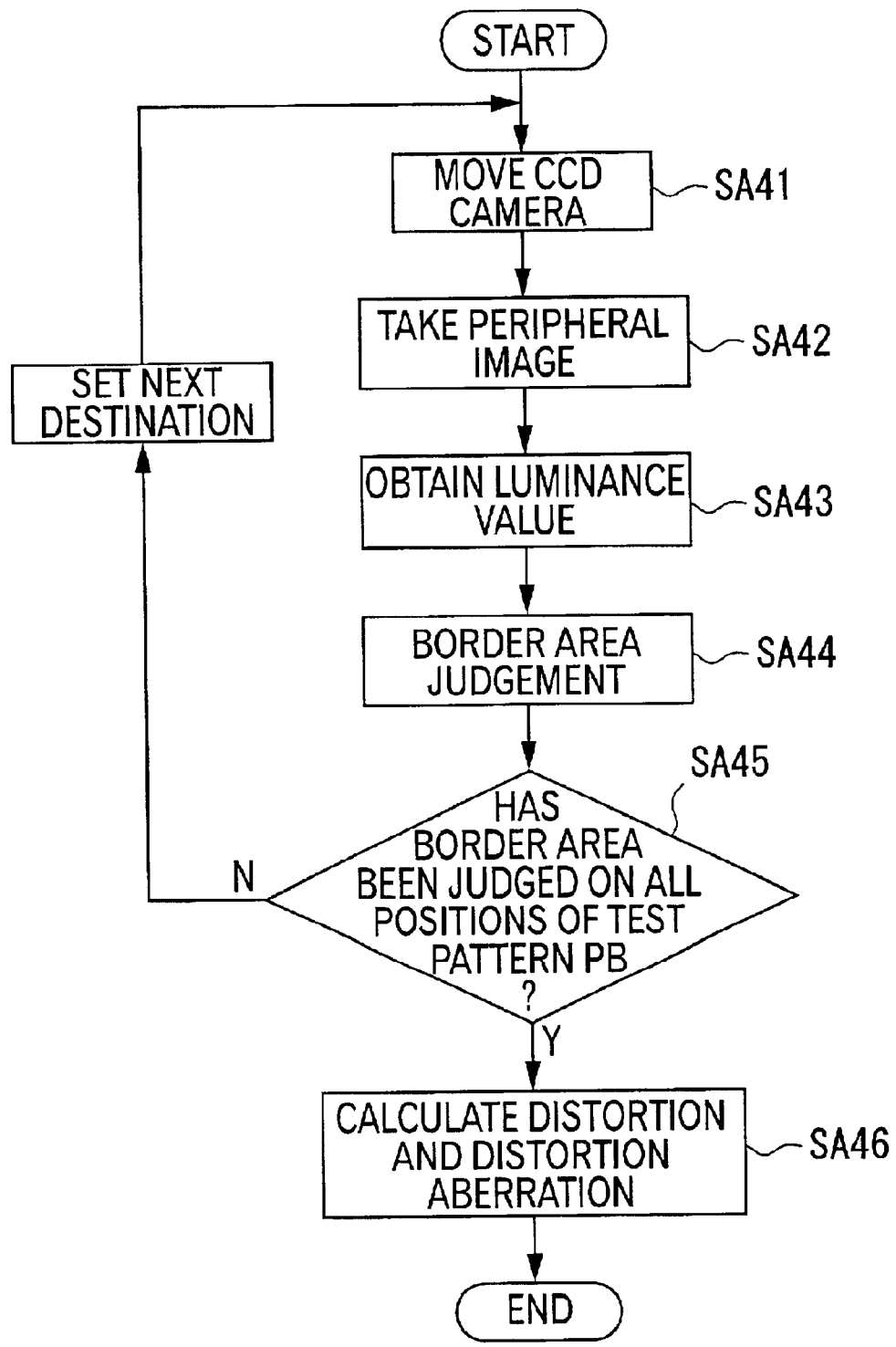
FIG. 22 is a flowchart for explaining calculation of distortion aberration of the aforesaid second embodiment.

(3) Next, the distortion aberration is calculated (step SA4). Specifically, the distortion aberration is calculated according to flowchart shown in FIG. 22.

(3-1) The image sensor controller 712 outputs a control signal based on the design data stored in the design data storage 716B of the storage 716 and moves the adjusting CCD cameras 620a to 620d to an initial position (step SA41: image sensor moving step).

(3-2) The peripheral image sensor 711 identifies the test patterns PA1 to PA4 formed on the four corners of the image area to detect the images thereof (step SA42: peripheral image acquiring step). Incidentally, the images of the test patterns PA1 to PA4 are identified by automatically searching by a pattern-matching process as a kind of image processing.

(3-3) The distortion aberration calculator 713 obtains the luminance value of the image detected by the peripheral image sensor 711 (step SA43). As shown in FIG. 19(a), the luminance value is obtained for single picture element line AX and AY in X-axis and Y-axis directions based on the design data stored in the design data storage 716B of the storage 716.

Figure 23:
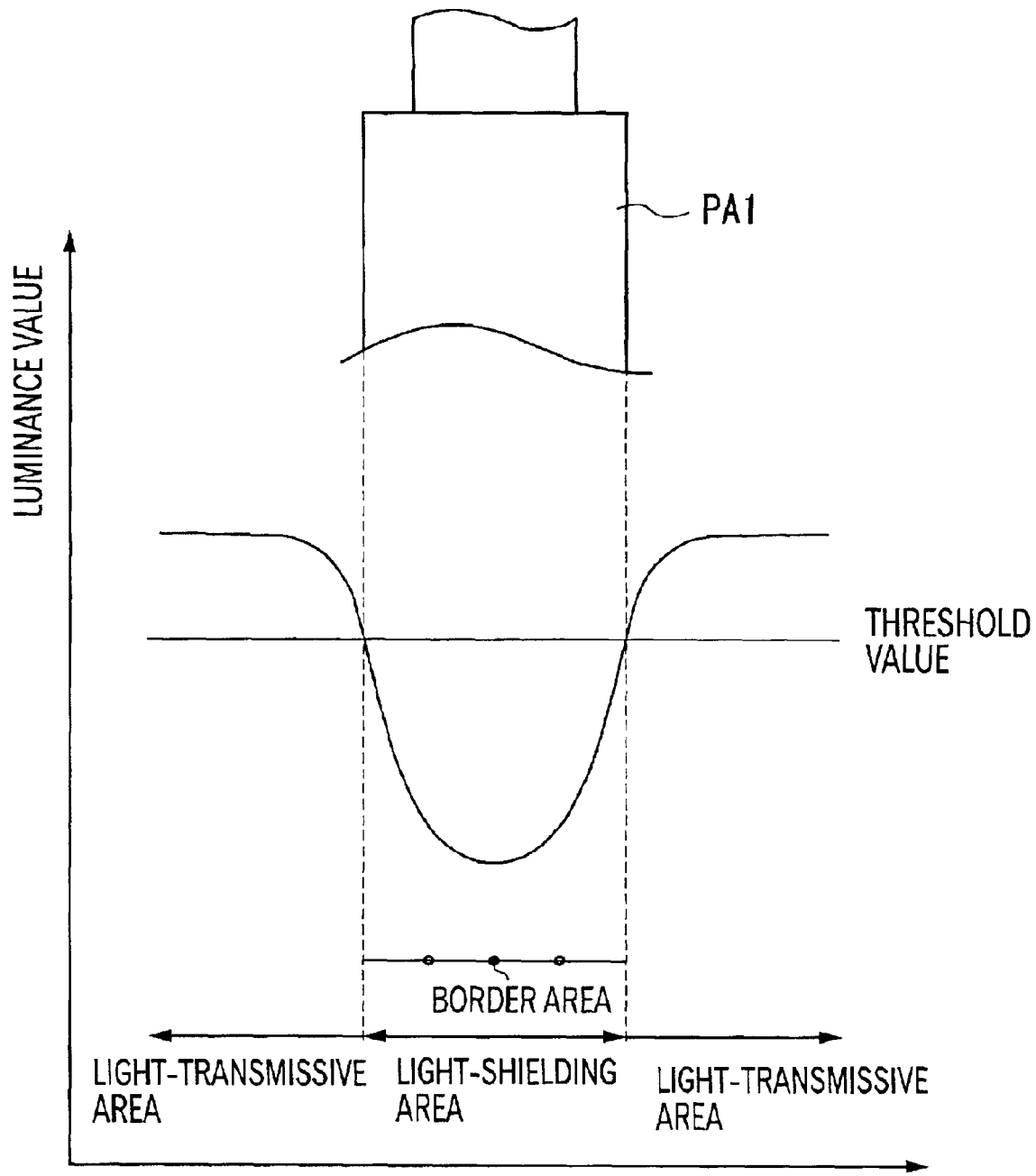
FIG. 23 is a graph showing a border area determination of the aforesaid second embodiment.

(3-4) The distortion aberration calculator 713 determines the border area from the obtained luminance value (step SA44). As shown in FIG. 23, in order to determine the border area, the light-shielding area of the test pattern is calculated from the obtained luminance value and the threshold value set at a predetermined luminance value and the coordinates corresponding to midpoint of the light-shielding area is identified as the border area, the coordinates being stored in the actual data storage 716A of the storage 716 parallelizing the test pattern position.

(3-5) Next, the image sensor controller 712 outputs a control signal based on the design data stored in the design data storage 716B of the storage 716 to move the measuring CCD camera 640, where the image of the test pattern PB is taken, the luminance value is obtained and the border area is determined in the same manner as in the above. The test pattern PB is measured in the order of PB1 to PB12. The distortion aberration calculator 713 judges whether the border area has been determined on all positions of the test patterns PB1 to PB12 based on the coordinates data of the test pattern stored in the actual data storage 716A of the storage 716 (step SA45). When the border area is not determined on all of the positions, the next measuring position is set and a control signal is sent to the image sensor controller 712 based on the set movement. The luminance value of the test pattern PB is obtained on the single picture line orthogonal with the periphery of the rectangular light-shielding portion 10B as shown in FIG. 19(b).

(3-6) Next, the distortion aberration calculator 713 calculates the distortion and distortion aberration of the projected image based on all of the coordinates data of the test patterns PA and PB stored in the actual data storage 716A of the storage 716 (step SA46: Distortion aberration calculating step).

Figure 24:
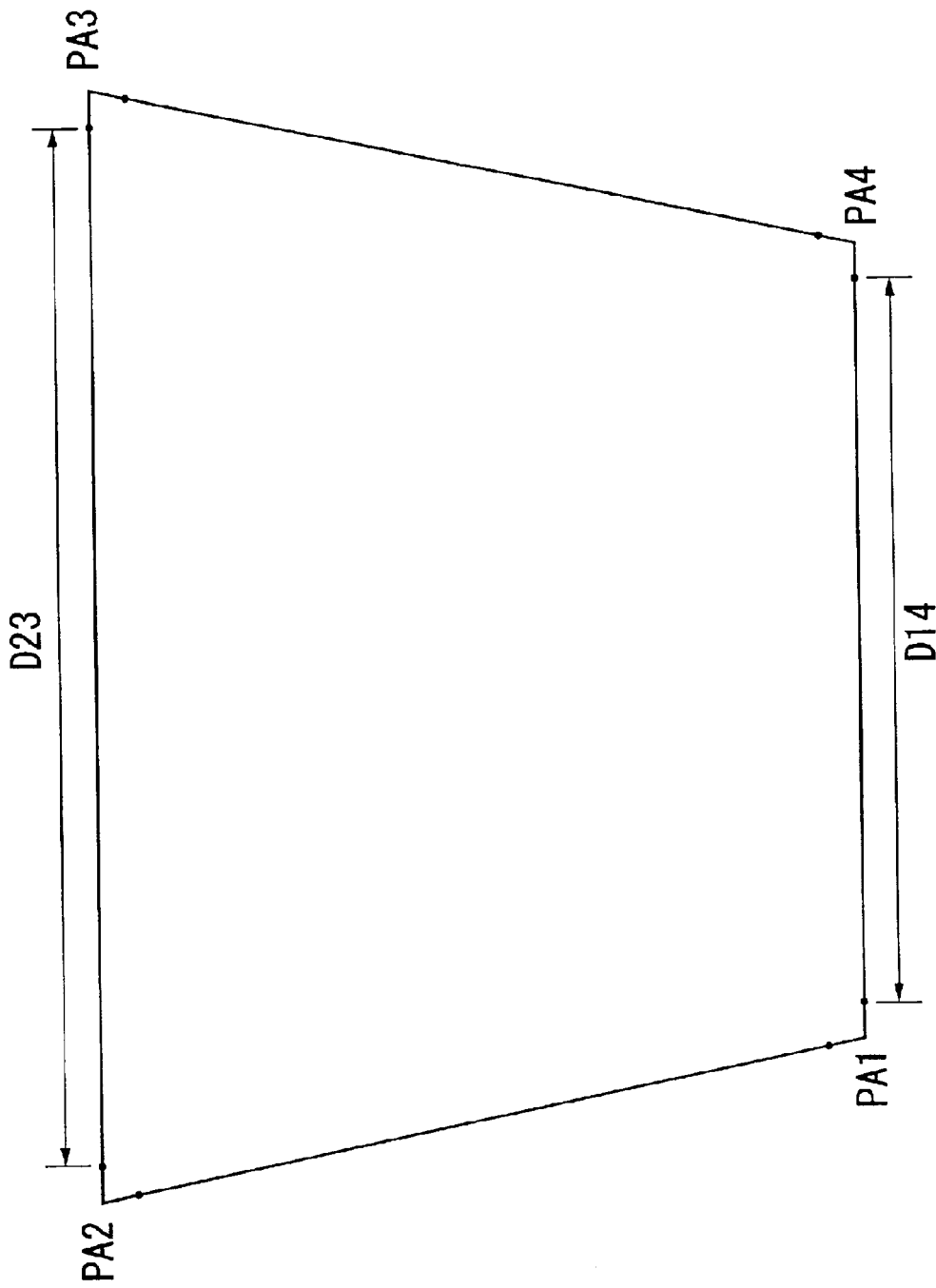
FIG. 24 is an illustration showing calculation of image distortion of the aforesaid second embodiment.

Specifically, the distortion of the projected image is calculated based on the coordinates data of the test patterns PA1 to PA4 formed on the four corners as shown in FIG. 24. The distortion aberration calculator 713 fetches the coordinates data of the test patterns PA1 to PA4 formed on the four corners stored in the actual data storage 716A of the storage 716 and calculates a distance D23 between the coordinates calculated by the test pattern PA2 and the coordinates calculated by the test pattern PA3 and a distance D14 between the coordinates calculated by the test pattern PA1 and the coordinates calculated by the test pattern PA4, whereby the distortion $\epsilon 1$ (%) is calculated by the following formula [16].

$$\epsilon 1 = 100*(D23-D14)/(D23+D24) \quad [16]$$

Figure 25:
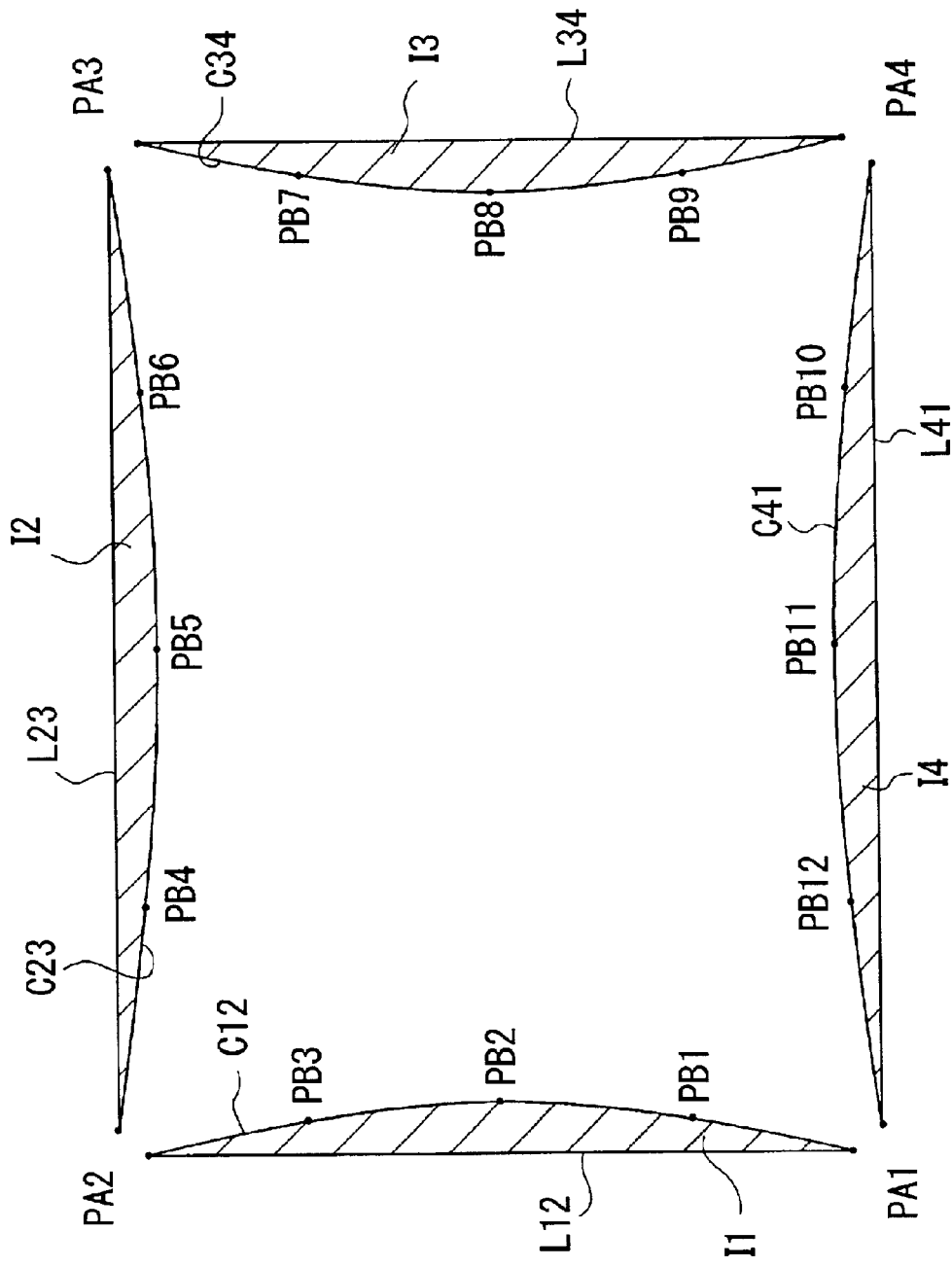
FIG. 25 is a graph for calculating lens distortion aberration of the aforesaid second embodiment.

The distortion aberration is calculated based on the all of the coordinates data calculated by the test patterns PA1 to 4 and the test patterns PB1 to PB12 as shown in FIG. 25.

The distortion aberration calculator 713 fetches the coordinates data of the test patterns PA1 to PA4 and the PB1 to PB12 stored in the actual data storage 716A of the storage 716. Then, using coordinates data of five points for every periphery of the projected image, the distortion aberration calculator 713 calculates an approximate curve C12, C23, C34 and C41 and calculates straight lines L12, L23, L34 and L41 based on the coordinates data of the test patterns PA1 to PA4. The distortion aberration calculator 713 calculates areas I1, I2, I3 and I4 surrounded by closed curve formed by the calculated four approximate curves and the four linear lines and calculates distortion aberration ϵ2 (%) based on the four areas and the designed area I0 of projected image according to following formula [17].

$$\epsilon 2 = 100*(I1+I2+I3+I4)/Io \quad [17]$$

The distortion aberration ϵ2 (%) is calculated as a minus value in case of pincushion distortion as shown in FIG. 25 and the distortion aberration ϵ2 (%) is calculated as a plus value in case of barrel distortion.

Figure 26:
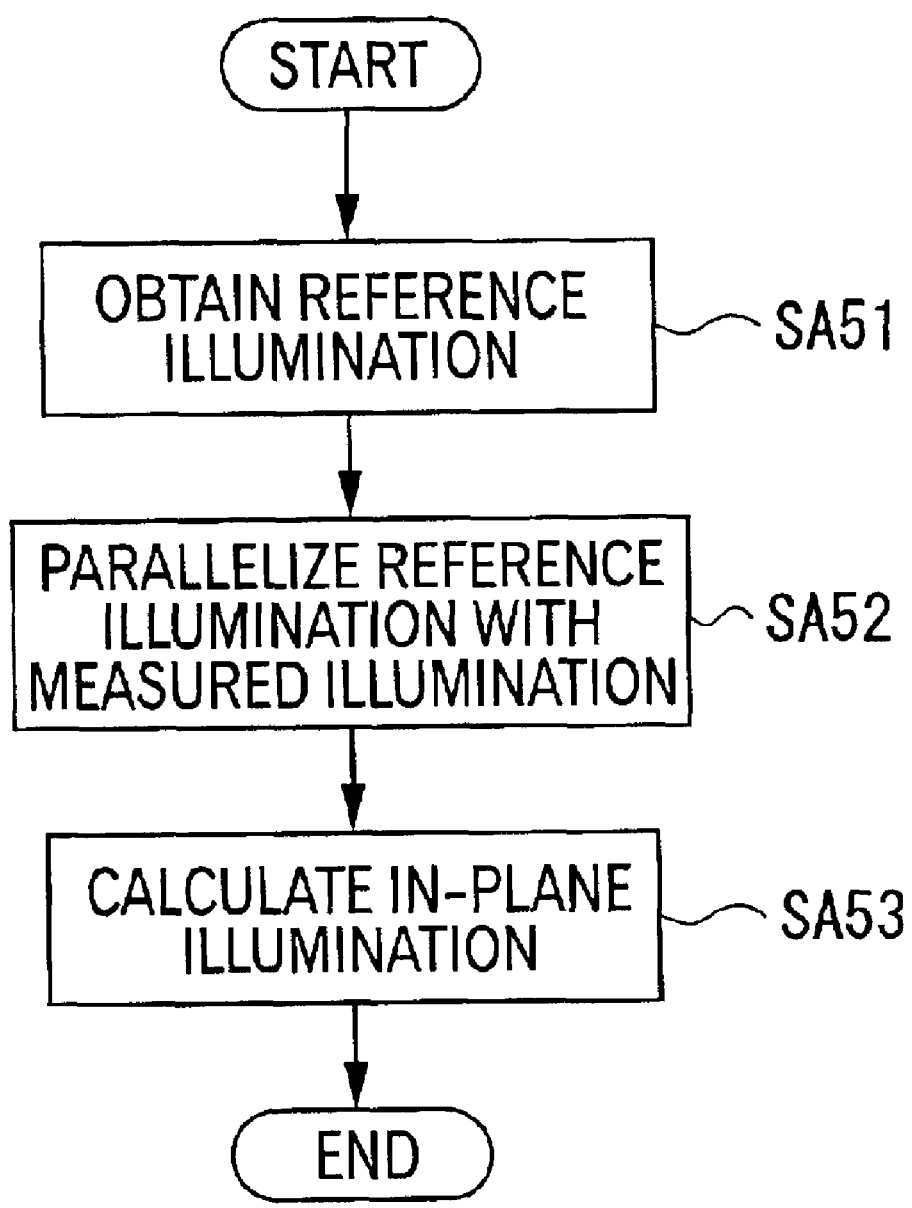
FIG. 26 is a flowchart for explaining evaluation method of in-plane illumination of the aforesaid second embodiment.

(3-7) The distortion aberration calculator 713 stores the distortion of the image calculated as in the above and the distortion aberration of the projection lens into the actual data storage 716A of the storage 716 parallelizing the product number of the lens.
(4) Next, the in-plane illumination is calculated (step SA5). Specifically, the in-plane illumination is calculated in accordance with the flowchart shown in FIG. 26.
(4-1) The illumination sensor 650 measures the illumination Lo of the test pattern 10A located at the lower peripheral center of the image area (step SA51: predetermined-position illumination acquiring step). The in-plane illumination calculator 714 fetches the input level data stored in the actual data storage 716A of the storage 716 and parallelize the input level value Iio calculated at the position of the test pattern 10A with the illumination Lo (step SA52).
(4-2) The in-plane illumination calculator 714 calculates an illumination Le at the other positions based on the input level value Iie at the position, the illumination Lo of the test pattern 10A and the input level value Iio according to following formula [18] (step SA53: in-plane illumination calculating step).

$$Le = lo * Iie/Iio \quad [18]$$

(4-3) The in-plane calculator 714 stores the in-plane illumination calculated as in the above into the actual data storage 716A of the storage 716 while parallelizing with the product number of the projection lens 160.

According to the above-described second embodiment, following advantages can be obtained as well as the same advantages (1) to (5).

(6) The lens evaluation apparatus according to the present embodiment has the processing portion 710 including the peripheral image sensor 711, the image sensor controller 712 and the distortion aberration calculator 713, the check sheet 550 formed with a rectangular frame light-shielding portion 10B entirely surrounding the plurality of test patterns 10A, the light-shielding portion 10B having test patterns PA and PB disposed along the rectangular profile of the light-shielding portion, where the image sensor controller 712 controls the movement of the adjusting CCD cameras 620a to 620d and the measuring CCD camera 640, the peripheral image sensor 711 detects the images of the test patterns PA and PB disposed along the rectangular profile of the light-shielding portion 10B and the distortion aberration calculator 713 can measure the distortion ϵ1 of the projected image and the distortion aberration ϵ2 of the projection lens 160 by identifying the outer profile of the projected image. Accordingly, the quality of the projection lens 160 can be accurately and rapidly determined.
(7) In calculating the distortion aberration of the projection lens 60 (step SA4), since the luminance value is obtained at one picture element line of the test patterns PA and PB disposed at the light-shielding portion 10B (step SA43) and the border area is determined by identifying the light-shielding area based on the obtained luminance value and the threshold value set at a predetermined luminance value where the midpoint of the light-shielding area is set as the border area, the profile of the light-shielding portion 10B can be highly accurately identified and the distortion aberration can be appropriately evaluated.
(8) Since the processing portion 710 includes the resolution evaluation value calculator 717 and the in-plane illumination calculator 714 and the illumination sensor 650 are disposed at the lower peripheral center of the image area on the screen, the in-plane illumination calculator 714 can calculate the in-plane illumination Le of the projected image based on the plurality of input level values Iie and Iio calculated by the resolution evaluation value calculator 717 and the illumination Lo measured by the illumination sensor 650. Since the resolution evaluation value calculator 717 corrects the input level value by adding the background luminance value lo, the in-plane illumination Le of the projected image can be evaluated according to the same standard. Accordingly, the in-plane illumination of the projected lens 160 can be appropriately evaluated without being influenced by the type of the projection lens 160 to be evaluated, the position of the resolution-evaluating test pattern 10A displayed on the screen 500 etc.
(9) Since the projection lens 160 to be checked is arranged as a lens set having a plurality of light-condenser (not shown) disposed along the optical axis direction and the size of the projected image can be changed in three stages, i.e. wide (large), middle (medium) and tele (small), by changing the relative position of the respective light-condensers where the quality of the projection lens 160 can be determined by calculating the resolution evaluation value MTF in three conditions of wide (large), middle (medium) and tele (small), when the projection lens 160 is installed in a projector, shift in resolution evaluation value MTF caused when the size of the image is changed can be reduced in the projector.
(10) Since the processing portion 710 includes the storage 716, the image sensor controller 712 can move the adjusting CCD cameras 620a to 620d to an initial position corresponding to the projected image based on the design data stored in the design data storage 716B of the storage 716 and the movement of the measuring CCD camera 640 can be controlled at a predetermined movement amount. Further, the evaluation value of the projection lens calculated by the resolution evaluation value calculator 717, the distortion aberration calculator 713 and the in-plane illumination calculator 714 can be stored in the actual data storage 716A of the storage 716 after parallelizing the production number.

(5) Modification of Embodiment

The scope of the present invention is not restricted to the above embodiments, but includes modification described below.

Though the light adjuster of the CCD cameras 620a to 620d and 640 are used for maintaining proportional relationship between the luminance value of the light incident on the image sensor and the output signal, the arrangement is not restrictive. Specifically, when there is change in the background luminance value, the light entering into the image sensor of the CCD cameras 620a to 620d and 640 may be adjusted by a light adjuster according to the change, and the light amount of the light incident on the image sensor may be set constant irrespective of the background luminance value. In this case, since the light amount of the light incident on the image sensor is constant, even when the resolution evaluation value is calculated by the conventional formula [12], the value can be evaluated using the same standard.

Further, though the resolution evaluation value MTF is calculated by the formula [11] in the above embodiments, the arrangement is also not restrictive. In other words, any arrangement is possible as long as the resolution evaluation value can be obtained based on the background luminance value, the maximum luminance value and the minimum luminance value, and the resolution evaluation value may be calculated using the other formula.

Further, though the present invention is used for evaluating the projection lens 160 in the above embodiment, such arrangement is not restrictive. Specifically, the present invention may be used for other optical system constituting a projector and an optical system used for machines other than the projector.

Though the parallel-line resolution-measuring patterns PT1 and PT2 are used in the above embodiment, the present invention may be used for a resolution-measuring pattern having gradually changing gradation based on a sine-wave response function or other resolution-measuring pattern.

Though the approximate curves C12, C23, C34 and C41 are calculated by the coordinates value of the test patterns PA and PB for each periphery of the light-shielding portion 10B displayed on the screen and the straight lines L12, L23, L34 and L41 are calculated from the coordinates value of the test pattern PA, whereby the distortion aberration ε2 of the projection lens 160 is calculated based on the areas I1, I2, I3 and I4 surrounded by the calculated four approximate curves and the straight lines, such arrangement is not restrictive. Specifically, any arrangement is possible as long as the distortion aberration can be calculated based on the configuration of the light-shielding portion 10B of the check sheet 550 or the outer profile of the image formation area, and the distortion aberration may be calculated using the other method.

Though the illumination sensor 650 is disposed at the center of the lower end of the image formation area on the screen, the arrangement is not restrictive and the illumination sensor may be disposed at any position corresponding to the test pattern 10A of which resolution evaluation value is obtained. Alternatively, the illumination may be measured at a plurality of positions within the projected image surface through a moving mechanism.

The specific structure and configuration in implementing the present invention may be arranged in any manner as long as an object of the present invention can be achieved.

What is claimed is:

1. A lens evaluation method, comprising the steps of:
irradiating an image light including a resolution-measuring test pattern onto a screen through a lens to display an image of the resolution-measuring test pattern on the screen;
detecting a luminance of the image of the displayed test pattern by an image import device using an image sensor, a resolution evaluation value being calculated based on the detected luminance value;
acquiring a background luminance value of a background part without the test pattern being formed by the image import device using the image sensor;
acquiring a maximum luminance value in the test pattern image by the image import device using the image sensor;
acquiring a minimum luminance value in the test pattern image by the image import device using the image sensor; and
calculating the resolution evaluation value based on the background luminance value, the maximum luminance value and the minimum luminance value obtained through the respective steps.

2. The lens evaluation method according to claim 1, wherein the resolution evaluation value (MTF) calculated by the evaluation value calculating step is represented as $$MTF=(Imax\text{-}Imin)/(Io*2\text{-}Imax\text{-}Imin)$$

where the background luminance value is represented as Io, the maximum luminance value is represented as Imax and the minimum luminance value is represented as Imin.

3. The lens evaluation method according to claim 1, wherein the image sensor is a charge coupled device and the background luminance value acquiring step, the maximum luminance value acquiring step and the minimum luminance value acquiring step are conducted at a part where an output of the charge coupled device in response to the luminance value is in proportional relationship.

4. The lens evaluation method according to claim 1, wherein the lens is arranged as a lens set including a plurality of light condensers disposed along an optical axis direction and has a zooming function for enlarging and reducing a projected image by changing relative position of the respective light condensers, and
wherein the background luminance value acquiring step, the maximum luminance value acquiring step and the minimum luminance value acquiring step are conducted at least for the minimum magnification and maximum magnification of the lens respectively.

5. The lens evaluation method according to claim 1, wherein the image sensor is movable along the screen, the method further comprising the steps of:
moving the image sensor along an outer periphery of the projected image projected on the screen;
acquiring the peripheral image of the projected image at a predetermined position by the image import device using the image sensor while moving the image sensor; and
calculating a distortion aberration of the projected image based on the peripheral image of the projected image acquired during the peripheral image acquiring step.

6. The lens evaluation method according to claim 5,
wherein a check sheet formed with the test pattern includes a frame portion formed adjacent to an outer periphery of a formation area of the projected image, and
wherein the image of the frame portion is acquired during the peripheral image acquiring step.

7. The lens evaluation method according to claim 1, further comprising the steps of:
calculating an input level value based on the background luminance value, the maximum luminance value and the minimum luminance value, wherein the background luminance value acquiring step, the maximum luminance value acquiring step, the minimum luminance value acquiring step and the input level value calculating step are conducted at a plurality of positions in the projected image;

acquiring an illumination at a predetermined flint position of the projected image where the background luminance value, acquiring step, the maximum luminance value acquiring step, the minimum luminance value acquiring step and the input level value calculating step are conducted; and calculating an in-plane illumination of the entire projected image by calculating the illumination of a second position other than the first position based on the input level value and illumination at the first position and the input level value at the second position.

8. The lens evaluation method according to claim 7, wherein the illumination (Le) at the second position is represented as $$Le = L.o * Iie / Iio$$

where the input level value at the second position is represented as Iie, the input level value at the first position is represented as Iio and the illumination at the first position is represented as Lo.

* * * * *